(12) United States Patent
Saunshi et al.

(10) Patent No.: US 11,354,019 B2
(45) Date of Patent: Jun. 7, 2022

(54) ELECTRONIC DEVICE AND METHOD FOR CONTROLLING SNOOZE NOTIFICATION

(71) Applicant: Samsung Electronics Co., Ltd., Gyeonggi-do (KR)

(72) Inventors: Nikunj Saunshi, Mumbai (IN); Parichay Kapoor, Gwalior (IN); Mehul Kumar, Jaipur (IN); Vishnu Vinjam, Vijayawada (IN)

(73) Assignee: Samsung Electronics Co., Ltd

( * ) Notice: Subject to any disclaimer, the term of this patent is extended or adjusted under 35 U.S.C. 154(b) by 44 days.

(21) Appl. No.: 15/752,129

(22) PCT Filed: Aug. 11, 2016

(86) PCT No.: PCT/KR2016/008566
§ 371 (c)(1),
(2) Date: Feb. 12, 2018

(87) PCT Pub. No.: WO2017/026732
PCT Pub. Date: Feb. 16, 2017

(65) Prior Publication Data
US 2018/0232114 A1 Aug. 16, 2018

(30) Foreign Application Priority Data
Aug. 12, 2015 (KR) .................. 10-2015-0113924

(51) Int. Cl.
*G06F 3/0482* (2013.01)
*G06F 3/04817* (2022.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
CPC .. G06F 3/0482; G06F 3/04817; G06F 3/0485; G06F 3/0488; G08B 5/22; G04F 1/005
See application file for complete search history.

(56) References Cited

U.S. PATENT DOCUMENTS

2005/0204001 A1* 9/2005 Stein .................... G06Q 10/107
709/206
2006/0088144 A1* 4/2006 Mitchell ................ G06Q 10/10
379/88.17

(Continued)

FOREIGN PATENT DOCUMENTS

EP          2688275       1/2014
KR     1020080007769     1/2008

(Continued)

OTHER PUBLICATIONS

PCT/ISA/210 Search Report issued on PCT/KR2016/008566 (pp. 3).
PCT/ISA/237 Written Opinion issued on PCT/KR2016/008566 (pp. 6).

*Primary Examiner* — Daniel W Parcher
(74) *Attorney, Agent, or Firm* — The Farrell Law Firm, P.C.

(57) ABSTRACT

A method of controlling a notification output from an electronic device according to the present invention may comprise the steps of: outputting notification information; display a snoozing time setting object; using the displayed snoozing time setting object and setting a snoozing time; and executing a snoozing mode for the notification information, and re-outputting the notification information after the selected snoozing time elapses. However, the present invention is not limited to the above embodiment and may include other embodiments.

10 Claims, 22 Drawing Sheets

(51) Int. Cl.
*G06F 3/0488* (2022.01)
*G04F 1/00* (2006.01)
*G08B 5/22* (2006.01)
*G06F 3/0485* (2022.01)

(52) U.S. Cl.
CPC .......... *G06F 3/04817* (2013.01); *G08B 5/22* (2013.01); *G04F 1/005* (2013.01)

(56) References Cited

U.S. PATENT DOCUMENTS

| | | | |
|---|---|---|---|
| 2006/0088153 A1 | 4/2006 | Wille | |
| 2007/0286029 A1 | 12/2007 | Rohrbacker et al. | |
| 2009/0247112 A1* | 10/2009 | Lundy | G06F 3/0237 |
| | | | 455/404.1 |
| 2010/0306650 A1* | 12/2010 | Oh | G06F 3/04883 |
| | | | 715/702 |
| 2011/0029870 A1 | 2/2011 | May et al. | |
| 2012/0081397 A1 | 4/2012 | de Paz | |
| 2012/0323933 A1* | 12/2012 | He | H04L 51/24 |
| | | | 707/749 |
| 2013/0044072 A1* | 2/2013 | Kobayashi | H04M 1/0237 |
| | | | 345/173 |
| 2013/0055157 A1* | 2/2013 | Park | G06Q 10/109 |
| | | | 715/810 |
| 2013/0069893 A1* | 3/2013 | Brinda | G06F 3/0488 |
| | | | 345/173 |
| 2013/0076661 A1 | 3/2013 | Reeves et al. | |
| 2014/0189533 A1* | 7/2014 | Krack | G06F 3/0481 |
| | | | 715/753 |
| 2014/0189597 A1 | 7/2014 | Kang | |
| 2014/0198628 A1* | 7/2014 | Yang | H04M 1/72566 |
| | | | 368/262 |
| 2014/0223347 A1* | 8/2014 | Seo | G06F 3/0482 |
| | | | 715/769 |
| 2014/0240138 A1 | 8/2014 | Lee et al. | |
| 2014/0253320 A1 | 9/2014 | Bender | |
| 2014/0349622 A1 | 11/2014 | Graham | |
| 2015/0082348 A1 | 3/2015 | Lee | |
| 2015/0094120 A1* | 4/2015 | Suh | G06F 3/04883 |
| | | | 455/566 |
| 2015/0106741 A1* | 4/2015 | Friend | H04L 51/16 |
| | | | 715/752 |
| 2015/0172440 A1* | 6/2015 | Cho | H04M 1/72547 |
| | | | 455/412.2 |
| 2015/0177970 A1* | 6/2015 | Choi | H04W 4/12 |
| | | | 715/752 |

FOREIGN PATENT DOCUMENTS

| | | |
|---|---|---|
| KR | 1020120069490 | 6/2012 |
| KR | 1020140086820 | 7/2014 |
| KR | 1020150051539 | 5/2015 |

* cited by examiner

FIG. 5
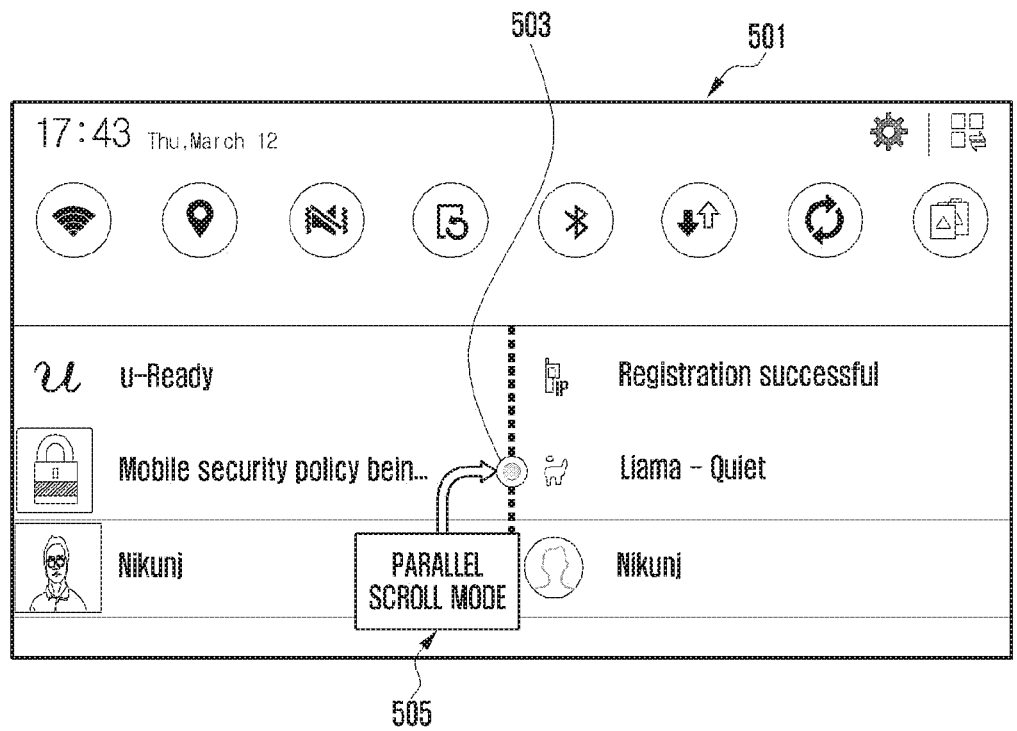
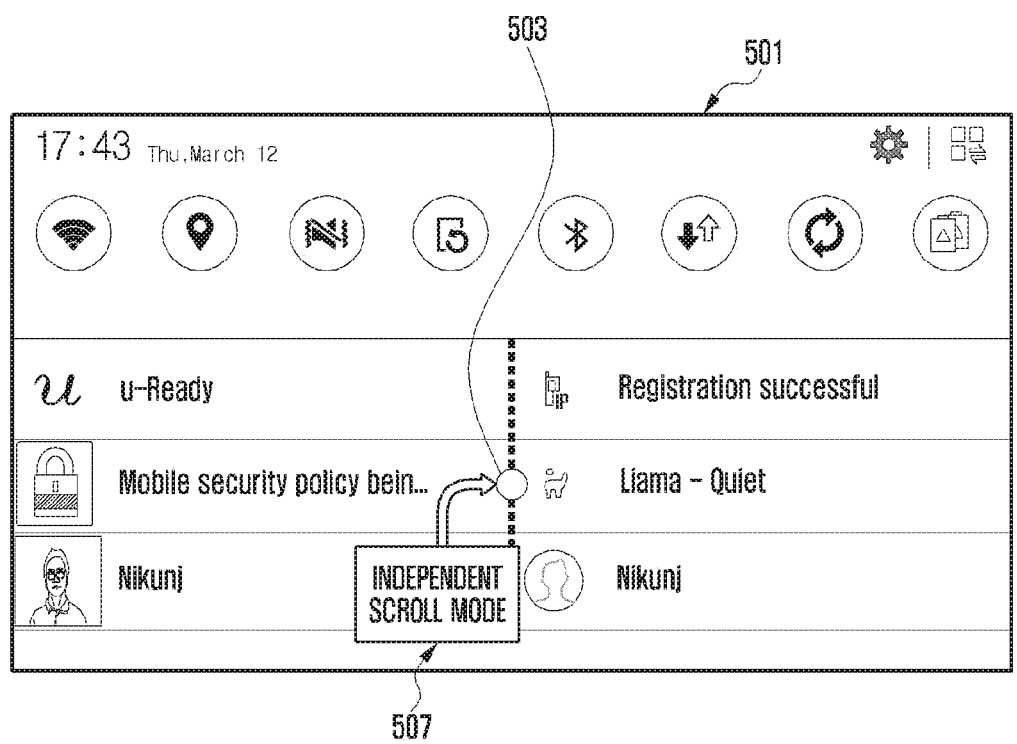

FIG. 12A
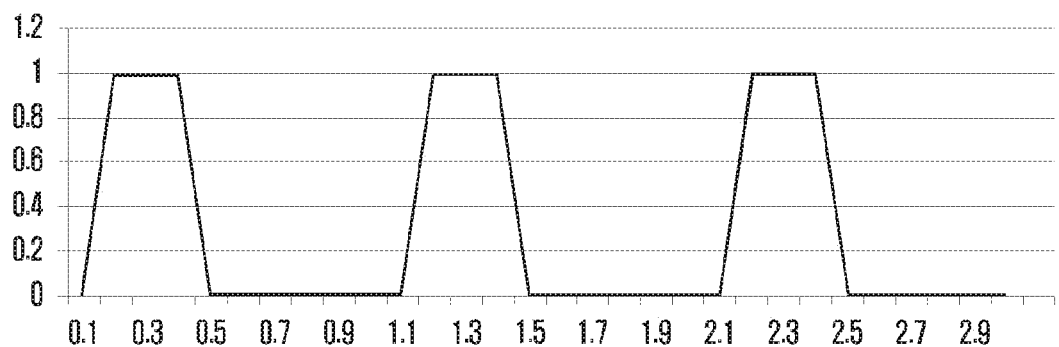
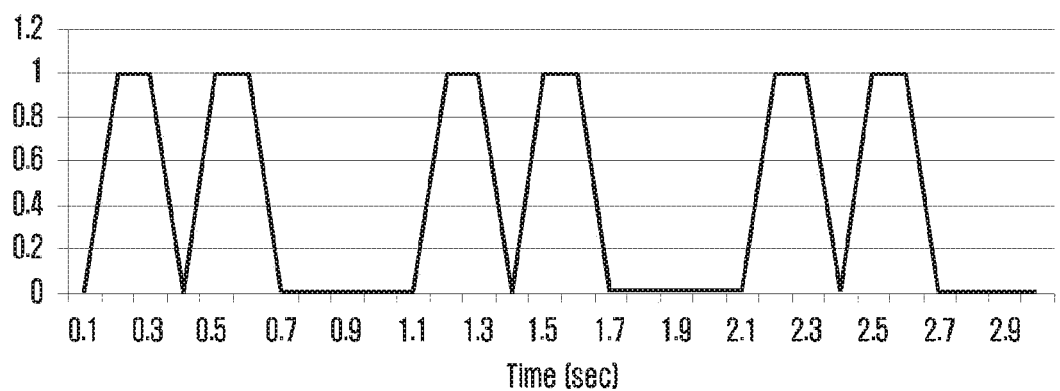
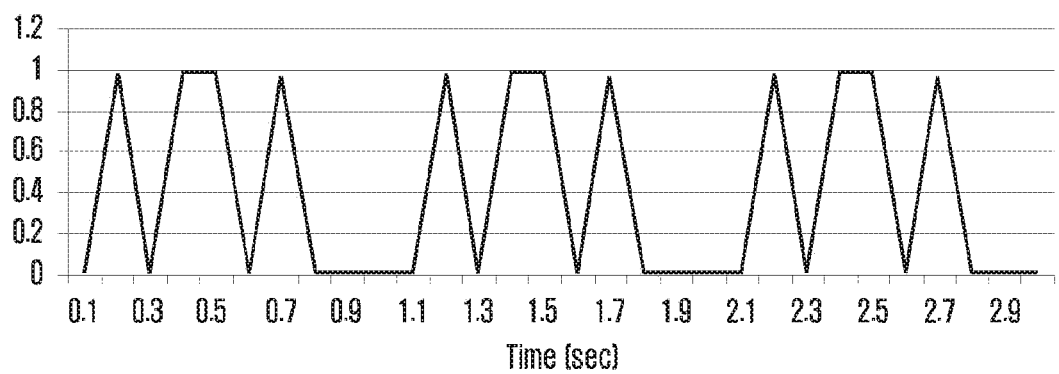

ELECTRONIC DEVICE AND METHOD FOR CONTROLLING SNOOZE NOTIFICATION

PRIORITY

This application is a National Phase Entry of PCT International Application No. PCT/KR2016/008566 which was filed on Aug. 11, 2016, and claims priority to Korean Patent Application No. 10-2015-0113924, which was filed on Aug. 12, 2015, the content of each of which is incorporated herein by reference.

TECHNICAL FIELD

The present invention relates to various methods for controlling notification output of an electronic device.

BACKGROUND ART

With the advance of information communication and semiconductor technologies, the use of mobile terminals has become popular. Recently introduced mobile terminals support various functions such as voice call, text messaging, music playback, digital broad cast reception, short-range radio communication, and Internet access.

Since the mobile terminal has become an essential part of everyday life for various purposes, it is important to enable the user to check the operation status of the mobile terminal in real time. The mobile terminal may display indication information such as communication status, battery charge status, ring tone setting status, alarm setting status, and incoming message status.

DISCLOSURE OF INVENTION

Technical Problem

When a notification is generated, the mobile terminal may display notification information by means of an indicator in a notification information display region preconfigured at a part of the home screen or determined by a user input. With the increasing diversity of applications that can be installed in recently-introduced mobile terminals, there is a need of a method for facilitating the output of various application-specific notifications.

Solution to Problem

In accordance with an aspect of the present invention, a notification output control method of an electronic device includes outputting notification information, displaying a snooze time setting object, setting a snooze time using the snooze time setting object, executing a snooze mode of the notification information, and re-outputting the notification information after expiry of the snooze time.

In accordance with another aspect of the present invention, an electronic device includes a touchscreen configured to display notification information and receive a touch input and a controller configured to control to output notification information, display a snooze time setting object, set a snooze time using the snooze time setting object, execute a snooze mode of the notification information, and re-output the notification information after expiry of the snooze time.

Advantageous Effects of Invention

The present invention is advantageous in terms of displaying multiple notification information to the user by dividing a screen into multiple areas.

The present invention is advantageous in terms of user-friendly notification information management by facilitating set-up of a snooze interval of notification information output.

The present invention is advantageous in terms of outputting an intuitive notification with a notification display pattern by allowing the notification display pattern to be preset per notification or the notification display pattern to be analyzed in real time.

The present invention is advantageous in terms of efficient display of notification information on a screen by providing the notification information per group according to a predetermined rule.

The present invention is advantageous in terms of making it possible to manage system notifications efficiently by allowing a server connected with multiple electronic devices through a network to manage the notification information per electronic device.

BRIEF DESCRIPTION OF DRAWINGS

FIG. 5 is a diagram illustrating exemplary screen displays for explaining a scroll mode of a notification tray in a landscape mode according to the first embodiment of the present invention;

FIG. 12A is a diagram illustrating notification patterns set based on importance of notification according to the third embodiment of the present invention;

MODE FOR THE INVENTION

Figure 1:
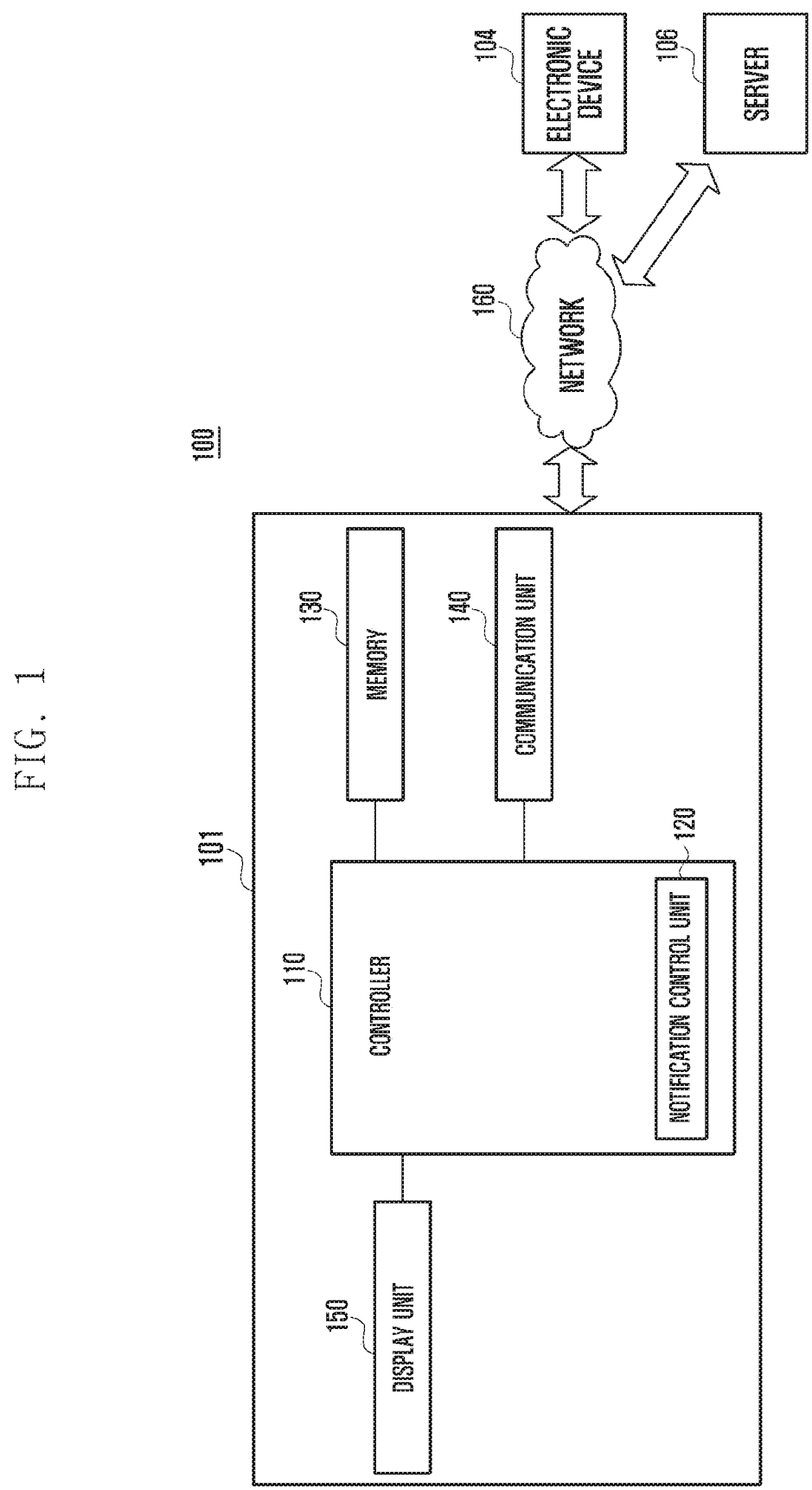
FIG. 1 is a diagram illustrating a network environment including an electronic device according to various embodiments of the present invention.

Exemplary embodiments of the present invention are described in detail with reference to the accompanying drawings. Various changes may be made to the invention, and the invention may have various forms, such that exemplary embodiments will be illustrated in the drawings and described in detail. However, such an embodiment is not intended to limit the invention to the disclosed exemplary embodiment and it should be understood that the embodiment includes all changes, equivalents, and substitutes within the spirit and scope of the invention. Throughout the drawings, like reference numerals refer to like components.

It will be understood that the expressions "comprises" and "may comprise" are used to specify the presence of a disclosed function, operation, component, etc., but they do not preclude the presence of one or more functions, operations, components, etc. It will be further understood that the terms "comprises" or "has" when used in this specification, specify the presence of a stated feature, number, step, operation, component, element, or a combination thereof, but they do not preclude the presence or addition of one or more other features, numbers, steps, operations, components, elements, or combinations thereof.

In the present invention, the expression "or" is taken as a specific disclosure of each and any combination of enumerated things. For example, A or B is to be taken as specific disclosure of each of A, B, and A and B.

In the present invention, expressions such as "$1^{st}$" or "first," "$2^{nd}$" or "second", etc. may modify various elements of the present invention, but they do not limit the relevant elements. For example, these expressions do not limit a sequence and/or importance of relevant elements. The expressions may be used for distinguishing one element from another element. For example, both a first user apparatus and a second user apparatus are user apparatuses, and they represent different user apparatuses. For example, a first element may be referred to as a second element and, similarly, the second element may be referred to as the first element.

It will be understood that when an element or layer is referred to as being "on", "connected to" or "coupled to" another element or layer, it can be directly on, connected to, or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the invention. As used herein, a singular form is intended to include plural forms as well, unless the context clearly indicates otherwise.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to an embodiment of the present invention, examples of an electronic device may include, but are not limited to, a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical device, a camera, and a wearable device (e.g., a head-mounted-device (HMD) such as electronic glasses, electronic clothes, an electronic bracelet, an electronic necklace, an appcessory, an electronic tattoo, and a smartwatch).

According to an embodiment of the present invention, examples of an electronic device may include smart home appliances. Examples of the smart home appliances may include a television, a digital video disk (DVD), an audio, a refrigerator, an air conditioner, a cleaner, an oven, a microwave oven, a laundry machine, a washing machine, an air cleaner, a set-top box, a television (TV) box (e.g., Samsung HomeSync™, Apple TV', and Google TV'), a game console, an electronic dictionary, an electronic key, a camcorder, and an electronic frame.

According to an embodiment of the present invention, examples of an electronic device may include a medical device (e.g., a magnetic resonance angiography (MRA) device, a magnetic resonance imaging (MRI) device, a computed tomography (CT) device, a camcorder, and a microwave scanner), a navigation device, a global positioning system (GPS) receiver), an event data recorder (EDR), a flight data recorder (FDR), an automotive infotainment device, a marine electronic device (e.g., marine navigation system gyro compass), an aviation electronics (avionics) device, a security device, an automotive head unit, an industrial or household robot, an automatic teller machine (ATM) of a financial company, and a point of sales (POS) terminal.

According to an embodiment of the present invention, examples of an electronic device may include furniture, part of a building/structure, an electronic board, an electronic signature receiving device, a projector, and a metering device (e.g., water, electricity, gas, and electric wave meters). According to an embodiment of the present invention, an electronic device may be a combination of two or more of the aforementioned devices. It is obvious to those skilled in the art that the electronic device of the present invention is not limited to the aforementioned devices.

Hereinafter, exemplary embodiments of the present invention are described in detail with reference to the accompanying drawings. In various embodiments of the present invention, the term "user" may be intended to include a person using an electronic device or a device using the electronic device (e.g., artificial intelligence electronic device).

In the following description, the term "notification" is intended to include novel information generated in association with an application running on an electronic device. The term "notification" may be interchangeably referred to as "notification information" and "notification-related information."

FIG. 1 is a diagram illustrating a network environment 100 including an electronic device 101 according to various embodiments of the present invention. In reference to FIG. 1, the electronic device 101 may include a controller 110, a memory 130, a communication unit 140, and a display 150.

The controller 110 may receive a command from the aforementioned components (e.g., memory 130, communication unit 140, and display 150), decode the received command, and execute an operation or process data according to the decoded command. The controller 110 may include a notification control unit 120 that controls displaying and/or managing the notification of the electronic device 101 according to various embodiments of the present invention.

The memory 130 may store a command or data received from or generated by the controller 110 or other components (e.g., communication unit 140 and display 150).

The display 150 may display various information (e.g., notification information) to the user. The display 150 may include a touchscreen that is capable of displaying information and receiving a user input. The data corresponding to the touch made by the user on the touchscreen may be provided to the controller 110.

The communication unit 140 may establish a communication link for the electronic device 101 to communicate with an external device (e.g., electronic device 104 or a server 106). For example, the communication unit 140 may connect to the network 160 through a wireless or wired connection for connection with the external device. The wireless communication may include at least one of wireless fidelity (Wi-Fi) communication, Bluetooth (BT) communication, near field communication (NFC), global positioning system (GPS) communication, and cellular communication (e.g., LTE communication, LTE-A communication, CDMA communication, WCDMA communication, UMTS communication, WiBro communication, and GSM communication). The wired communication may include at least one of universal serial bus (USB) communication, high definition multimedia interface (HDMI) communication, recommended standard 232 (RS-232) communication, and plain old telephone service (POTS) communication.

According to an embodiment of the present invention, the network 160 may be a telecommunications network. The telecommunications network may include at least one of a computer network, Internet, Internet of things, and telephone network.

Figure 2:
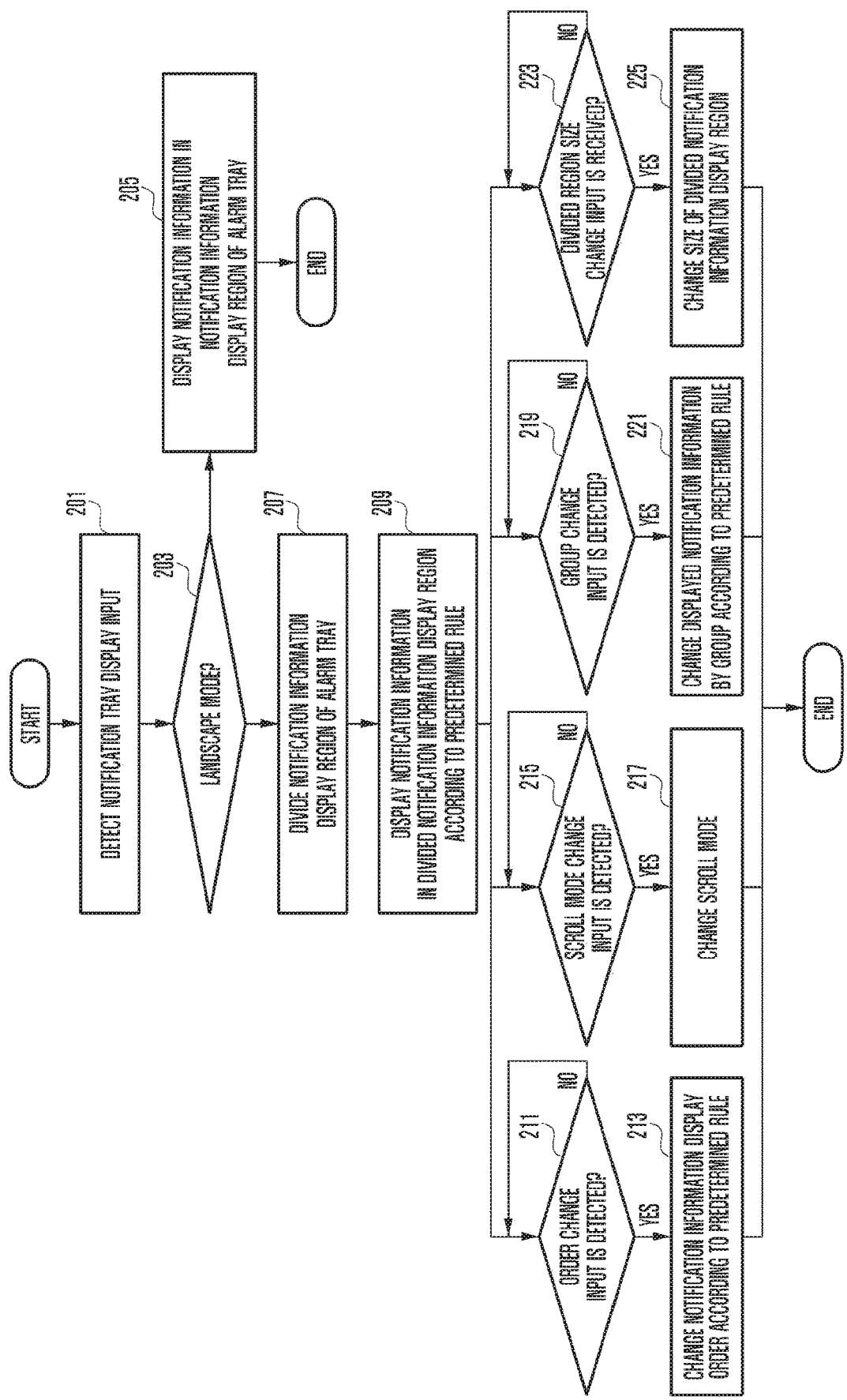
FIG. 2 is a flowchart illustrating a notification information display method of an electronic device according to the first embodiment of the present invention.

FIG. 2 is a flowchart illustrating a notification information display method of an electronic device (e.g., 101) according to a first embodiment of the present invention. In this embodiment, a notification tray may mean a window or part including a region for displaying notification information. For example, the operations depicted in FIG. 2 may be implemented by a notification control unit (e.g., 120) in the electronic device.

At step 201, the electronic device may detect a notification tray display input for displaying the notification tray. The electronic device may operate in a display mode (e.g., landscape mode or portrait mode) and determine at step at step 203 whether it is operating in the landscape mode in order to configure the notification tray based on the display mode. This step may be implemented as an operation of checking for the display mode of the electronic device.

If the display mode is not the landscape mode, e.g., if it is determined that the electronic device is operating in the portrait mode, the electronic device may display the notification tray for the portrait mode and present the notification information in a notification information display region of the notification tray at step 205.

If the display mode is the landscape mode, the electronic device may display the notification tray for the landscape mode and divide the notification information display region of the notification tray at step 207. Preferably, the width of the display in the landscape mode is twice the width of the display in the portrait mode and, in this embodiment, the electronic device may divide the width of the screen into two halves.

At step 209, the electronic device may display the notification information in the divided notification information display region according to a predetermined rule. For example, it may be possible to determine the notification information display order based on notification information creation or reception time and priority of the notification information or corresponding application.

According to an embodiment of the present invention, the electronic device may detect a notification information display order change input at step 211. If the electronic device detects the notification information display order change input, it may change the displayed notification information order according to a predetermined rule at step 213. For example, it may be possible to change such that the notification information with an importance or creation time having the next priority is changed to have a higher priority.

Alternatively, the electronic device may detect a scroll mode change input at step 215. In this embodiment, the scroll mode determines whether the divided notification information display region scrolls together or independently in response to the detected scroll input. The electronic device may be set to an independent scroll mode or a parallel scroll mode. If the scroll mode change input is detected, the electronic device may execute a changed scroll mode at step 217.

Alternatively, the electronic device may detect a notification information group change input at step 219. If the electronic device detects the notification information group change input, it may change the displayed notification information by group according to a predetermined rule at step 221. For example, it may be possible to change the display order of notification information of similar applications or a predetermined number of notification information items by group.

Alternatively, the electronic device may receive a divided region size change input at step 223. In this embodiment, the divided region size may mean the width of the divided notification information display region. If the electronic device receives the divided region size change input, it may change the divided notification information display region complementarily at step 225. For example, it may be possible to expand the width of a first divided region by reducing the width of a second divided region while the space occupied by the notification information display region is maintained in the notification tray.

Figure 3:
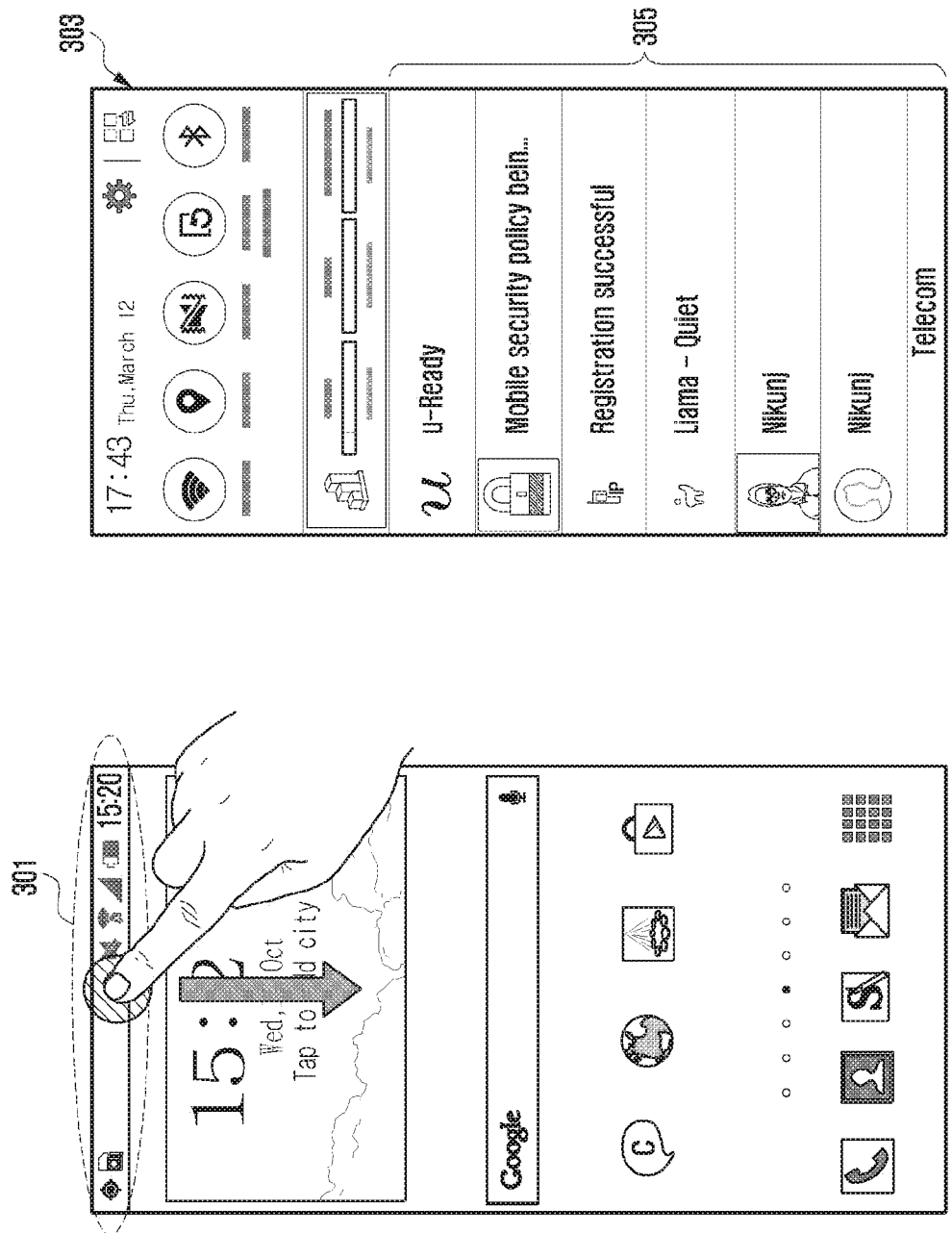
FIG. 3 is a diagram illustrating exemplary screen displays with a notification tray for displaying notification information.

FIG. 3 is a diagram illustrating exemplary screen displays with a notification tray for displaying notification information.

The electronic device (e.g., electronic device 101) may display a notification bar 301 at the top of the display (e.g., display 150). The notification bar may display application-specific notification information (e.g., battery information, network connection status information, and unanswered call information) in the form of indicators.

For example, if an input of downward drag starting from the notification bar is detected, the notification tray 303 may appear. However, the present invention is not limited to this operation, and it may include an embodiment of displaying the notification tray 303 based on an input made in various manners. FIG. 3 displays an exemplary screen display of the electronic device operating in the portrait mode. The notification tray 303 may include a notification information display region 305 for displaying at least one notification information.

Figure 4:
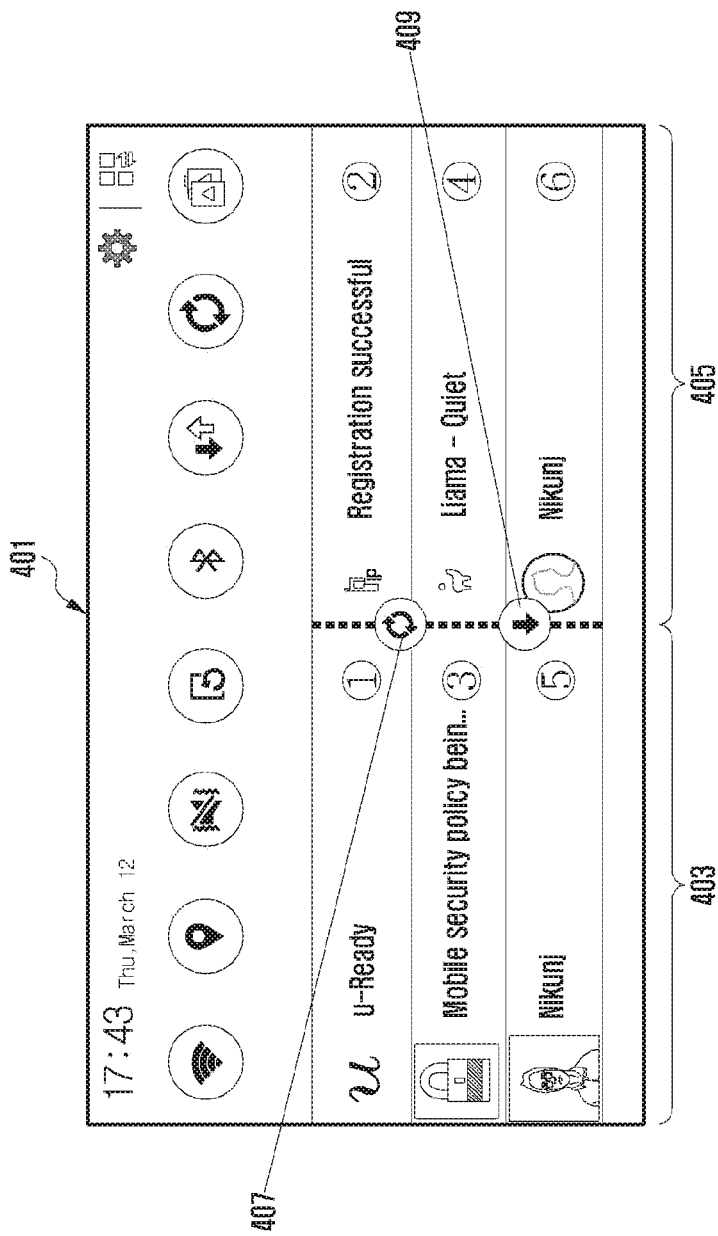
FIG. 4 is a diagram illustrating an exemplary screen display having a notification tray in the landscape mode according to the first embodiment of the present invention.

FIG. 4 is a diagram illustrating an exemplary screen display having a notification tray in the landscape mode according to the first embodiment of the present invention.

The electronic device (e.g., electronic device 101) may display the notification tray 501 in the landscape mode by means of the display (e.g., display 50). In the landscape mode, the notification tray 401 is displayed in response to a detection of a notification tray display input. If the display mode is switched from the portrait mode to the landscape mode while displaying the notification tray, the notification tray 401 may be changed to be suitable for the landscape mode. According to various embodiments of the present invention, it may be possible to control such that the display mode of the notification tray is switched even when the screen display mode switching function is set to off (e.g., the portrait mode is maintained, even when the electronic device orientation is changed from a portrait mode orientation to a landscape mode orientation).

The notification tray 401 may include the divided notification information display regions 403 and 405 for displaying at least one notification information. For example, it may be possible to divide the width of the screen into two halves in the landscape mode. The at least one notification information may be arranged in the divided notification information display regions 403 and 405 according to a predetermined rule. For example, the notification information display order may be determined based on a creation or reception time of notification information and importance of the notification information or corresponding application. The at least one notification information of which display order is determined may be arranged in order as shown in FIG. 4 but not limited thereto.

According to various embodiments of the present invention, the notification information display regions 403 and 405 may include a notification information display order change icon 407 and/or a notification information group change icon 409. The notification information display order change icon 407 and/or the notification information group change icon 409 may be displayed on a screen division boundary line. If the electronic device detects an input made on the notification information display order change icon 407, it may change the display order of the at least one notification information according to a predetermined rule. For example, the notification information with the importance or creation time having the next priority is changed to have a higher priority. If the electronic device detects an input made on the notification information group change icon 409, it may change the display order of the at least one notification information by group according to a predetermined rule. For example, it may be possible to change the display order of the notification information of similar applications or a predetermined number of notification information items by group.

FIG. 5 is a diagram illustrating exemplary screen displays for explaining a scroll mode of a notification tray in a landscape mode.

The notification tray 501 displayed by the electronic device (e.g., electronic device 101) in the landscape mode may include a scroll mode icon 503 in the notification information display regions. In this embodiment, the scroll mode is one of a mode for scrolling the divided notification information display regions together and a mode for scrolling the divided notification information display regions independently in response to a scroll input. The electronic device may define the case where the scroll mode icon 503 is in a first state as denoted by reference number 505 as a parallel scroll mode such that the divided notification information display regions are scrolled together in response to a scroll input. The electronic device may define the case where the scroll mode icon 503 is in a second state as denoted by reference number 507 as an independent scroll mode such that each of the divided notification information display regions is scrolled independently in response to a scroll input made for the corresponding notification information display region. If the electronic device detects an input made on the scroll mode icon 503, it may change the current scroll mode.

Figure 6:
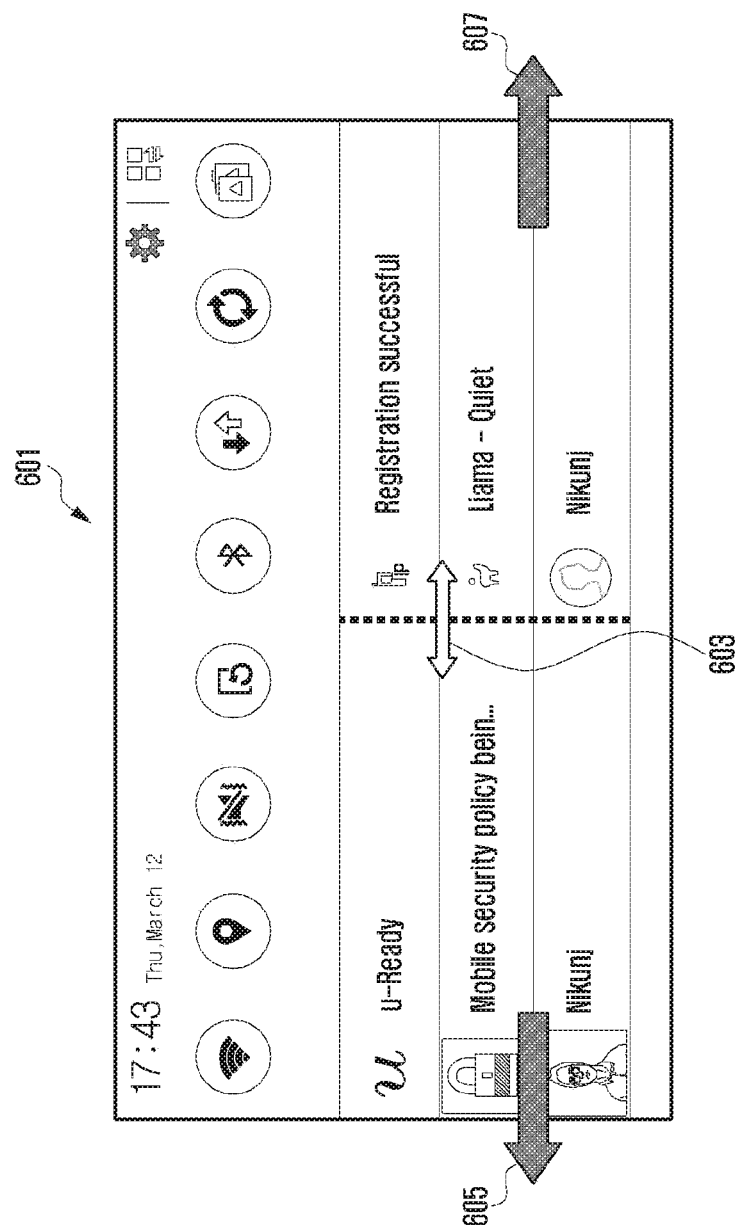
FIG. 6 is a diagram illustrating an exemplary screen display for explaining divided screen adjustment for a notification tray in the landscape mode according to the first embodiment of the present invention.

FIG. 6 is a diagram illustrating an exemplary screen display for explaining divided screen adjustment for a notification tray in the landscape mode.

The notification tray 601 displayed by the electronic device (e.g., electronic device 101) in the landscape mode may include a divided region size change icon 603 in the notification information display regions. In this embodiment, the divided region size may mean the width of a divided notification information display region. If the electronic device receives an input made on the divided region size change icon 603 (or division boundary move input), it may change the widths of the divided notification information regions in a complementary manner. For example, it may be possible to expand the width of a first divided region by reducing the width of a second divided region while the space occupied by the notification information display region is maintained in the notification tray.

Alternatively, if the electronic device detects a sweeping input made in each of the divided notification information display regions as denoted by the reference numbers 605 and 607, it may hide the notification information corresponding to the sweep input 605 and 607. The sweep inputs may be made in different directions as denoted by reference numbers 605 and 607 as shown in FIG. 6 or in the same direction.

Figure 7:
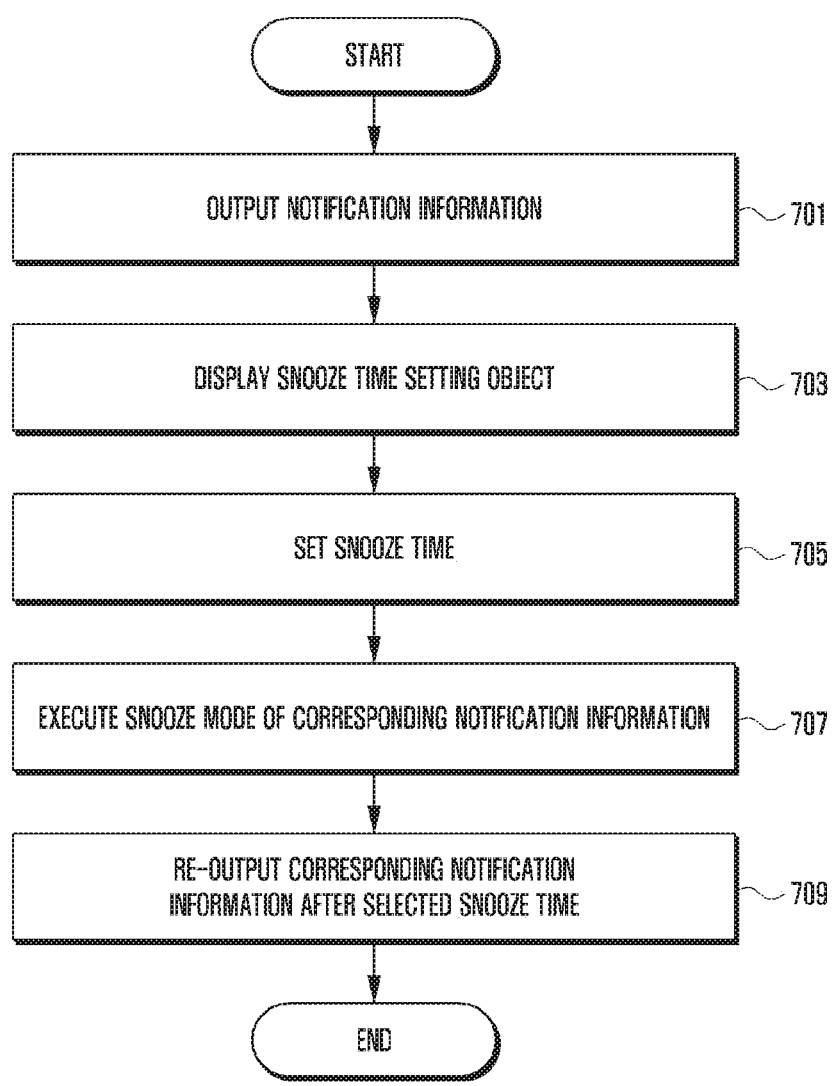
FIG. 7 is a flowchart illustrating a method for configuring a snooze mode of notification information of an electronic device according to the second embodiment of the present invention.

FIG. 7 is a flowchart illustrating a method for configuring a snooze mode of notification information of an electronic device (e.g., electronic device 101) according to the second embodiment of the present invention. In this embodiment, the snooze mode of notification information may mean deactivating the notification information display for snooze time and re-display the notification information after the expiry of the snooze time. For example, the operation depicted in FIG. 7 may be implemented by a notification control unit (e.g., control unit 120) of the electronic device.

The electronic device may output notification information at step 701. The electronic device may output the notification information using at least one of a display (e.g., display 150), an audio output unit, a vibration unit, and a light source unit.

At step 703, the electronic device may display a snooze time setting object related to the notification information to be output. In this embodiment, the snooze time setting object may be used as a tool for setting the snooze time for the notification information to be output. The snooze time setting object may be displayed along with the output of the notification information, after expiry of a predetermined time period, or in response to a predetermined input.

At step 705, the electronic device may set the snooze time for the notification information to be output based on the user input made to the snooze time setting object.

At step 707, the electronic device may execute the snooze mode of the corresponding notification information to be output. The snooze mode may be executed, when a user input made on the snooze time setting object is detected, along with the snooze time setting, or when a separate snooze mode execution input is detected.

At step 709, the electronic device may re-output the notification information in the snooze mode after expiry of the selected snooze time. According to an embodiment of the present invention, it may be possible to display the snooze time setting object when the notification information is re-output.

Figure 8:
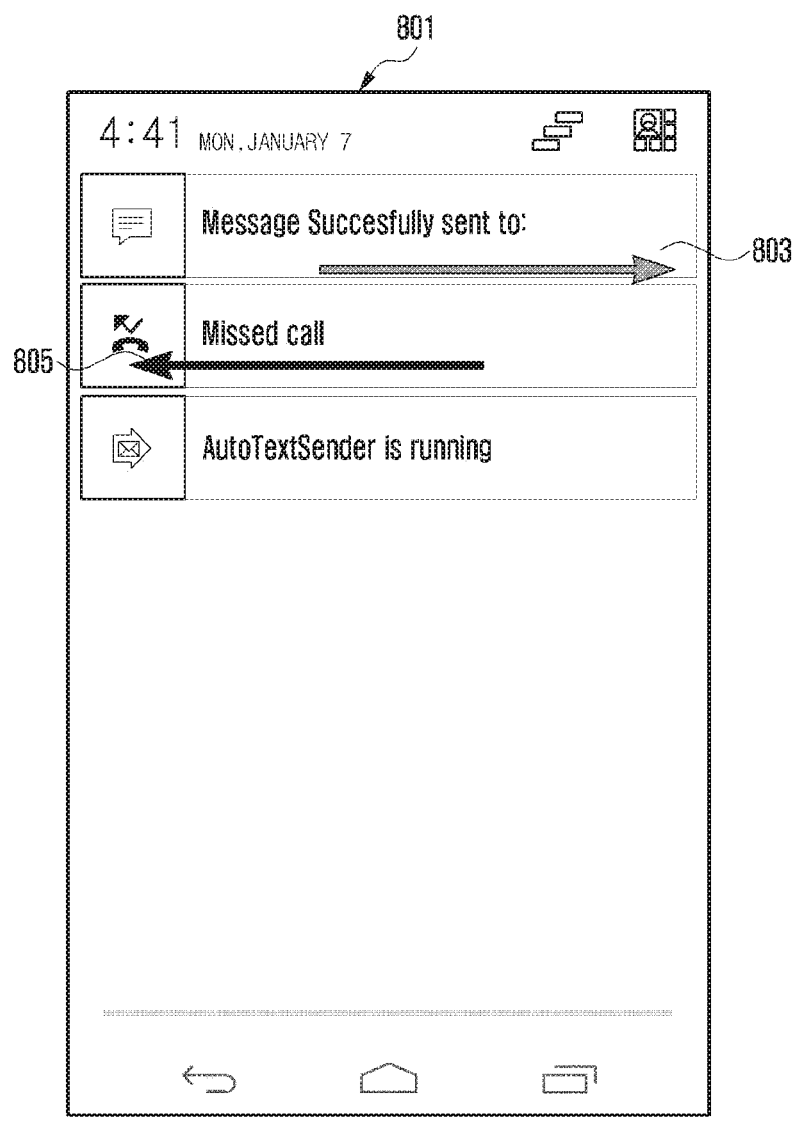
FIG. 8 is a diagram illustrating an exemplary screen display for notification information management according to the second embodiment of the present invention.

FIG. 8 is a diagram illustrating an exemplary screen display for notification information management.

The electronic device (e.g., electronic device 101) may output a notification tray 801 including a notification information display region by means of a display (e.g., display 150). The notification information display region may display at least one notification information.

For example, the electronic device may display a different management screen related to the notification management according to the direction of a sweep input made by the user on the notification information. For example, if a rightward sweep input 803 is detected, the electronic device may hide the corresponding notification. In contrast, if a leftward sweep input 805 is detected on the notification information, the electronic device may activate the snooze mode of the corresponding notification. Here, the snooze time may be set to a predetermined time.

Figure 9A:
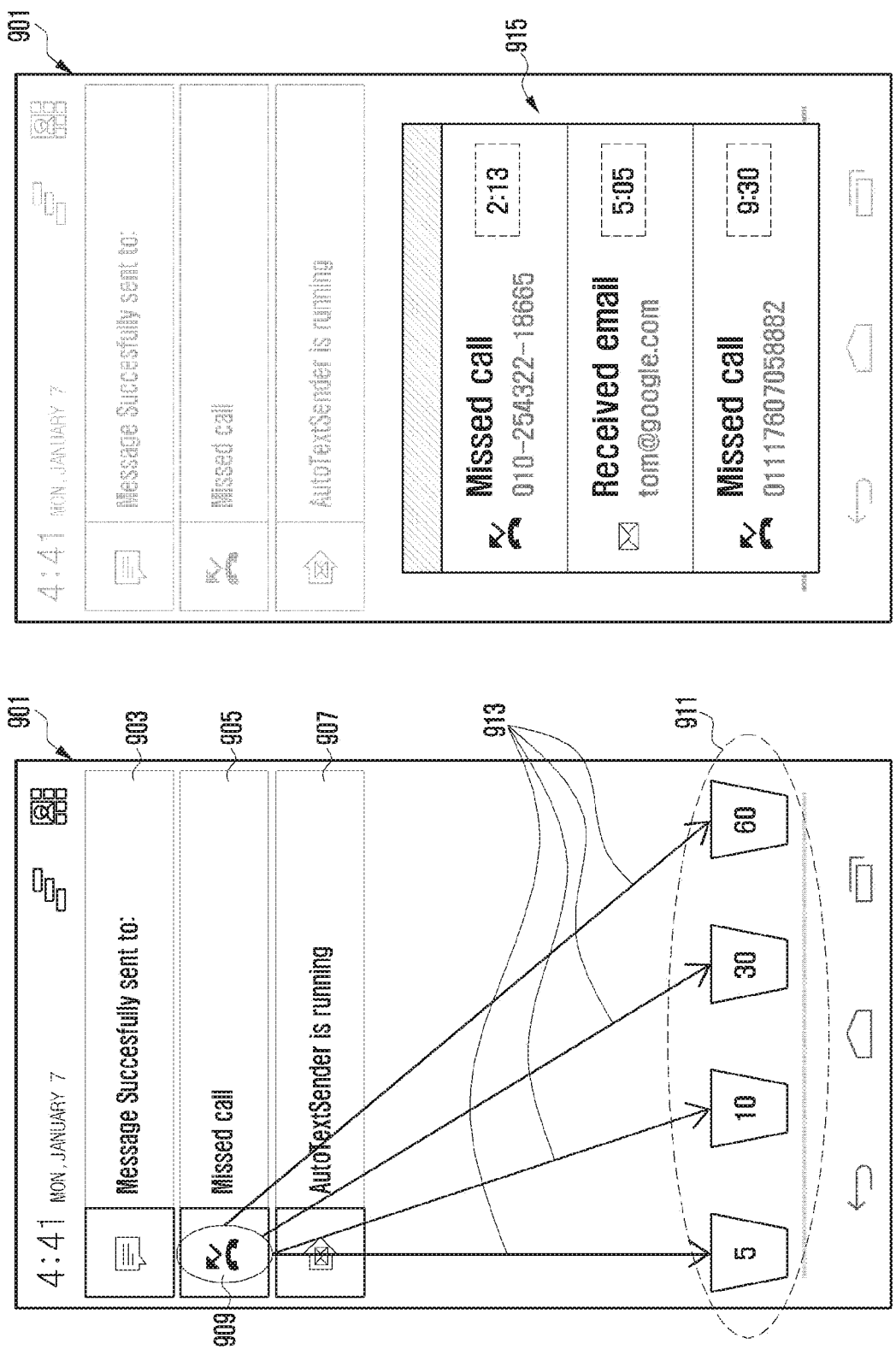
FIG. 9A is a diagram illustrating exemplary screen displays for explaining a method for setting a snooze mode of notification information according to the second embodiment of the present invention.

FIG. 9A is a diagram illustrating exemplary screen displays for explaining a method for setting a snooze mode of notification information.

The electronic device (e.g., electronic device 101) may output a notification tray 901 including a notification information display region by means of the display (e.g., display 150). The notification information display region may display at least one notification information 903, 905, and 907.

If a user input 909 (e.g., long press input) made to one of the notification information items (user input may be made on only the icons included in the displayed notification information), the electronic device may display multiple snooze time information items 911 as snooze time setting objects. The multiple snooze time information items 911 may each include preconfigured time information. If a drag input 913 continued from the user input 909 toward one of the multiple snooze time information items 911 is detected, the electronic device may set the snooze time to the time corresponding to the snooze time information on which the drag input 913 is released.

If the drag input 913 is released, the electronic device may execute the snooze mode of the notification information. For example, if the drag input 913 is released, it may be possible to display a list 915 containing at least one notification information being managed in the snooze mode while executing the snooze mode of the notification information. The list 915 may include information on the remaining times for re-outputting the notification information in the snooze mode. Although not shown, it may be possible to disable the snooze mode of the notification information in response to a user input made to the corresponding notification information. The notification function may be deactivated for the snooze mode-disabled notification information.

The notification information may be re-displayed in the notification display region after expiry of the snooze time. The electronic device may check for the corresponding notification information after the expiry of the snooze time and, if the notification tray 901 is displayed on the display according to a user request, display the corresponding notification information along with other notification information. For example, the notification information re-output according to the snooze mode may be arranged along with the other notification information in an order of priorities. For example, the re-output notification information may be displayed with a priority higher than that of other notification information in the notification information display region.

Figure 9B:
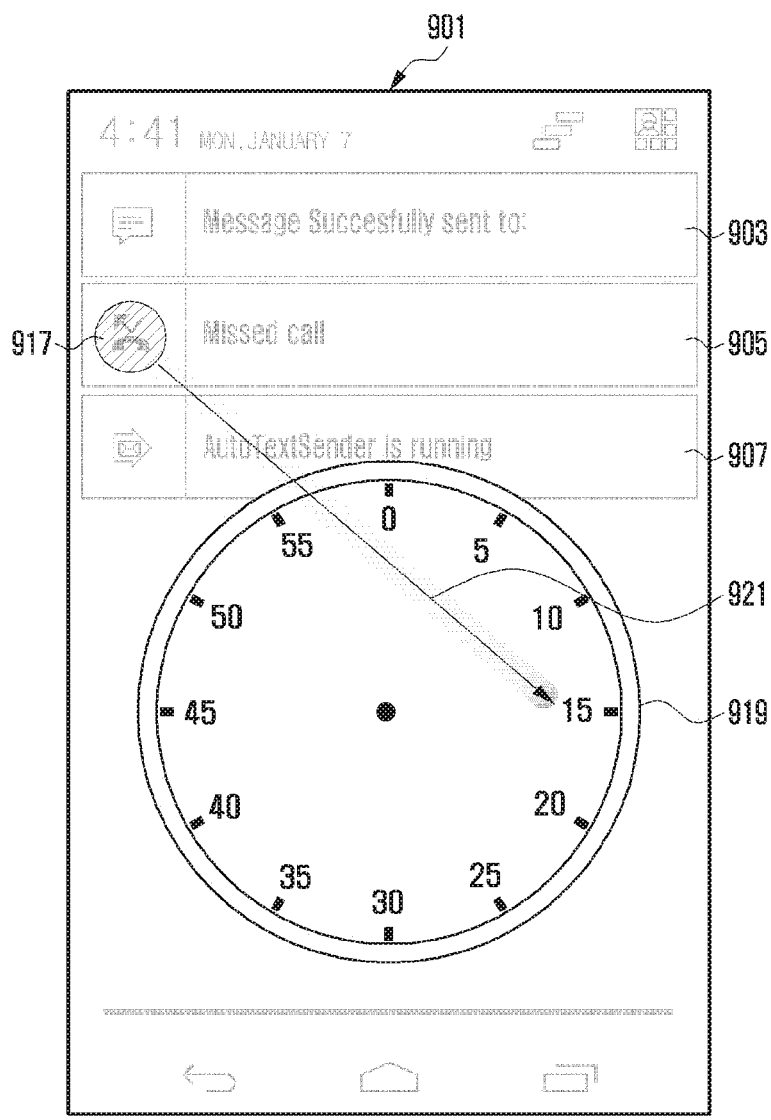
FIG. 9B is a diagram illustrating another exemplary screen display for explaining a method for setting a snooze mode of notification information according to the second embodiment of the present invention.

FIG. 9B is a diagram illustrating another exemplary screen display for explaining a method for setting a snooze mode of notification information.

The electronic device (e.g., electronic device 101) may output a notification tray 901 including a notification information display region by means of a display (e.g., display 150). At least one notification information 903, 905, and 907 may be displayed in the notification information region.

If a user input 917 (e.g., long press input) made to one of the notification information items (user input may be made on only the icons included in the displayed notification information), the electronic device may display a clock object 919 as a snooze time setting object. If a drag input 921 continued from the user input toward one of twelve numbers of the clock object 919 is detected, the electronic device may set the snooze time to the time corresponding to the number on which the drag input 921 is released. Also, if an input (not shown) for selecting a time is detected on the clock object 919, it may be possible to set the snooze time to the time selected by the input.

If the drag input 921 is released, the electronic device may execute the snooze mode of the notification information. After expiry of the snooze time, the corresponding notification information may be re-displayed in the notification information display region.

Figure 10A:
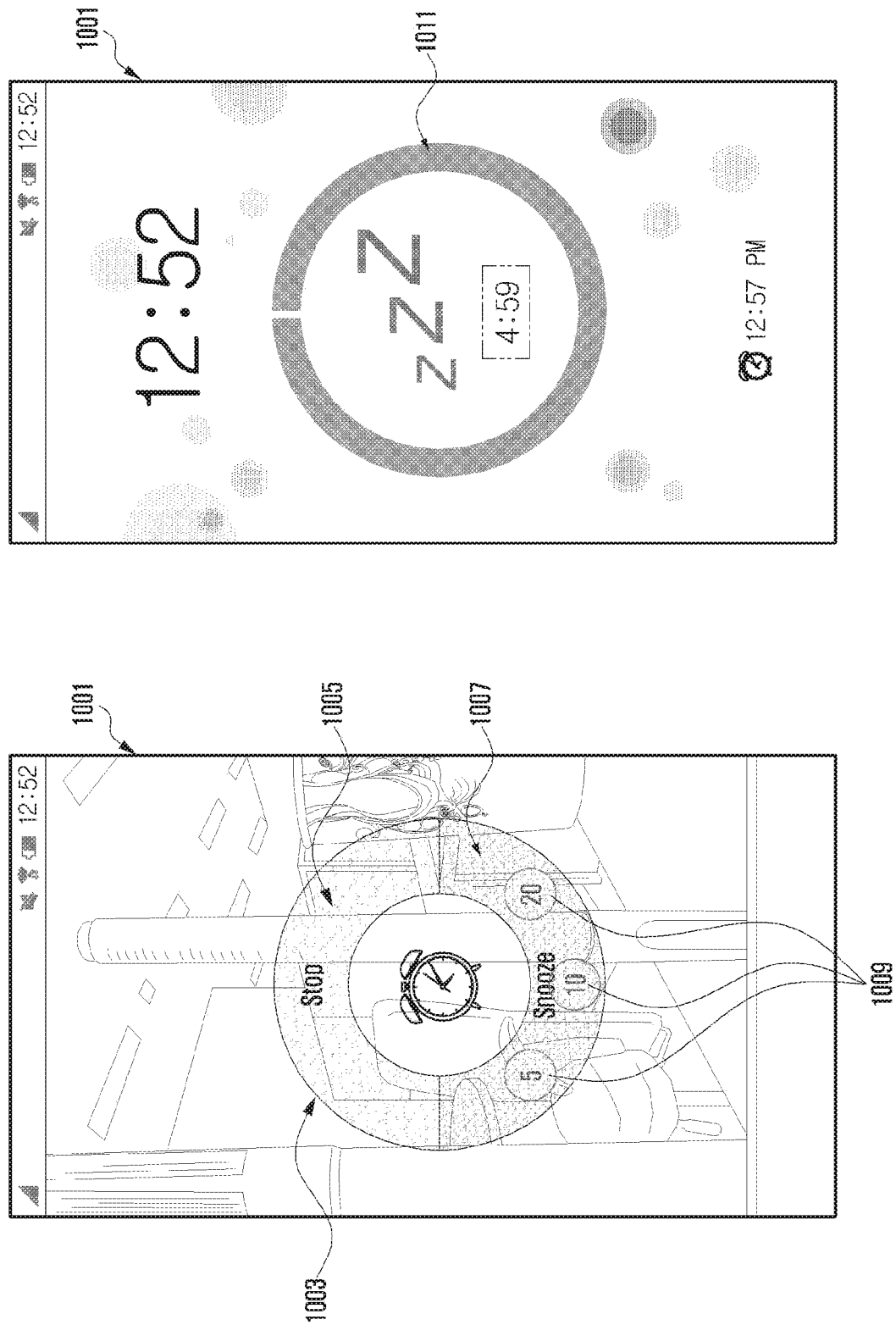
FIG. 10A is a diagram illustrating exemplary screen displays for explaining a method for setting a snooze mode of notification information according to the second embodiment of the present invention.

FIG. 10A is a diagram illustrating exemplary screen displays for explaining a method for setting a snooze mode of a notification.

The electronic device (e.g., electronic device 101) may display a notification object 1001 by means of a display (e.g., display 150) when a notification time arrives. The notification object 1001 may include a notification release input region 1003 and a snooze setting input region 1005. The snooze setting input region 1005 may include a plurality of snooze time information items 1007 for setting the snooze time.

If the electronic device detects an input for selecting one of the snooze time information items 1007, it may activate the snooze mode of the corresponding notification while setting the snooze time to the selected snooze time information. If the snooze mode is activated, the electronic device may display a snooze object 1009 by means of the display. The snooze object 1009 may include information on the remaining time for re-outputting the corresponding notification. After expiry of the snooze time, the notification object 1001 may be redisplayed on the display.

Figure 10B:
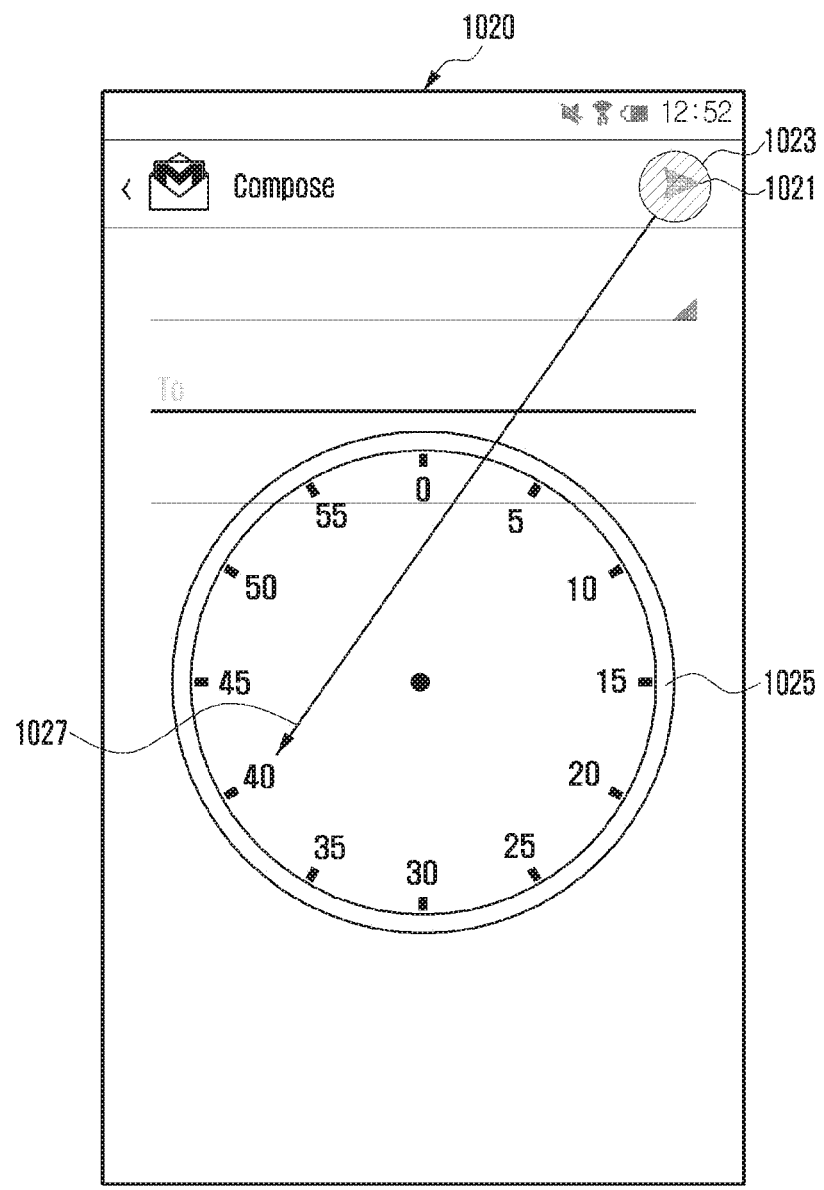
FIG. 10B is a diagram illustrating an exemplary screen display for explaining a method for setting a snooze mode for a predetermined function of an application running on an electronic device according to the second embodiment of the present invention.

FIG. 10B is a diagram illustrating an exemplary screen display for explaining a method for setting a snooze mode for a predetermined function of an application running on an electronic device.

The electronic device (e.g., electronic device 101) may execute an arbitrary application and display an execution screen of the application on the display (e.g., display 150). The execution screen of the application may include various menus related to the functions of the application.

For example, the electronic device may execute a messaging (or email) application to perform a message transmission function. If it is intended to transmit a written message after a predetermined time, the electronic device may configure the snooze mode of the written message transmission function according to the manipulation of the user.

For example, if a predetermined user input 1023 (e.g., long press input) made to a "send" menu 1021 displayed in the message application execution screen is detected, the electronic device may display a clock object 1025 as an example of the snooze time setting object. If a drag input 1027 continued from the user input toward one of twelve numbers of the clock object 1025 is detected, the electronic device may set the snooze time to the time corresponding to the number on which the drag input 1027 is released. Also, if an input (not shown) for selecting a time is detected on the clock object 1025, it may be possible to set the snooze time to the time selected by the input.

If the drag input 1027 is released, the electronic device may execute the snooze mode of the written message transmission function. After expiry of the snooze time, the written message may be transmitted to a predetermined counterpart.

Figure 10C:
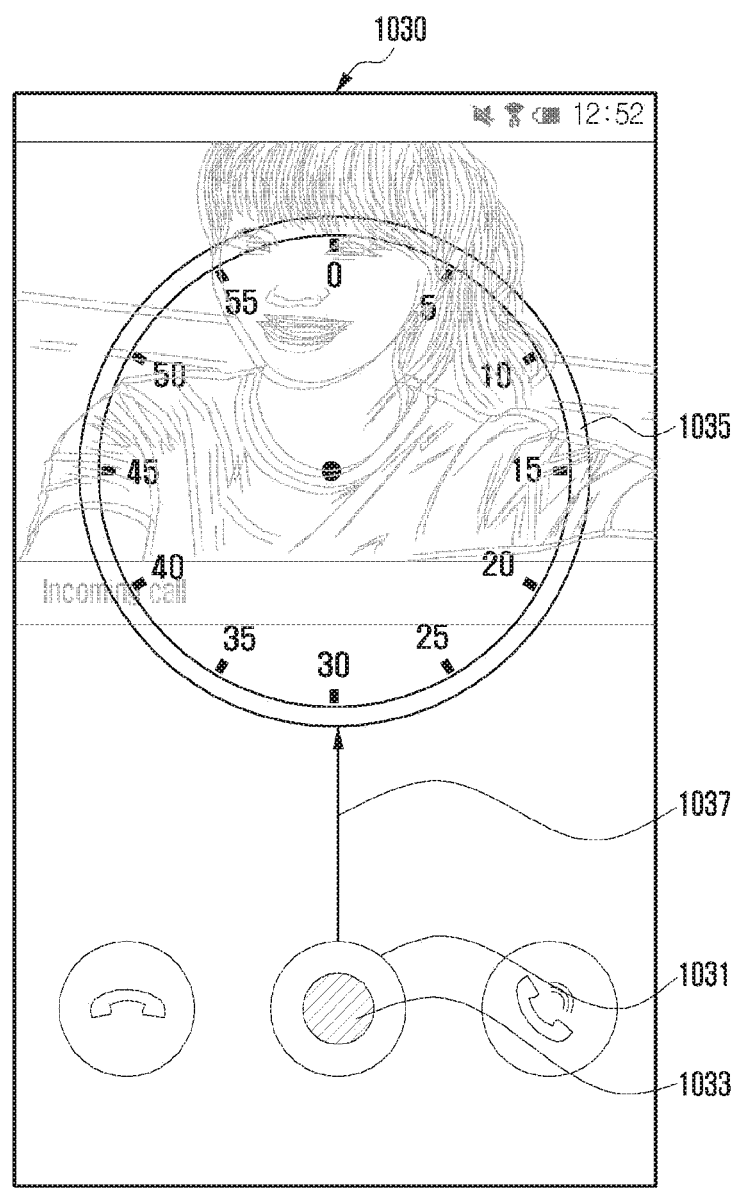
FIG. 10C is a diagram illustrating another exemplary screen display for explaining a method for setting a snoozing mode for a predetermined formation of an application running on an electronic device according to the second embodiment of the present invention.

FIG. 10C is a diagram illustrating another exemplary screen display for explaining a method for setting a snoozing mode for a predetermined formation of an application running on an electronic device.

For example, the electronic device may execute a voice call application to receive an incoming call. If the user rejects the incoming call and then wants to check the incoming call history after a predetermined time, the electronic device may configure the snooze mode for checking the incoming call history according to a manipulation of the user.

For example, if a predetermined user input 1033 (e.g., long press input) is detected in a snooze menu 1031 displayed on the voice call application execution screen, the electronic device may display a clock object 1035 as an example of the snooze time setting object. The snooze menu 1031 may be different from or identical with a call end menu. If a drag input 1037 continued from the user input toward one of twelve numbers of the clock object 1035 is detected, the electronic device may set the snooze time to the time corresponding to the number on which the drag input 1037 is released. Also, if an input (not shown) for selecting a time is detected on the clock object 1035, it may be possible to set the snooze time to the time selected by the input.

If the drag input 1037 is released, the electronic device may execute the snooze mode of the incoming call history check function. After expiry of the snooze time, the incoming call history may be displayed on the screen. The incoming call history may be displayed in the notification information display region.

Figure 10D:
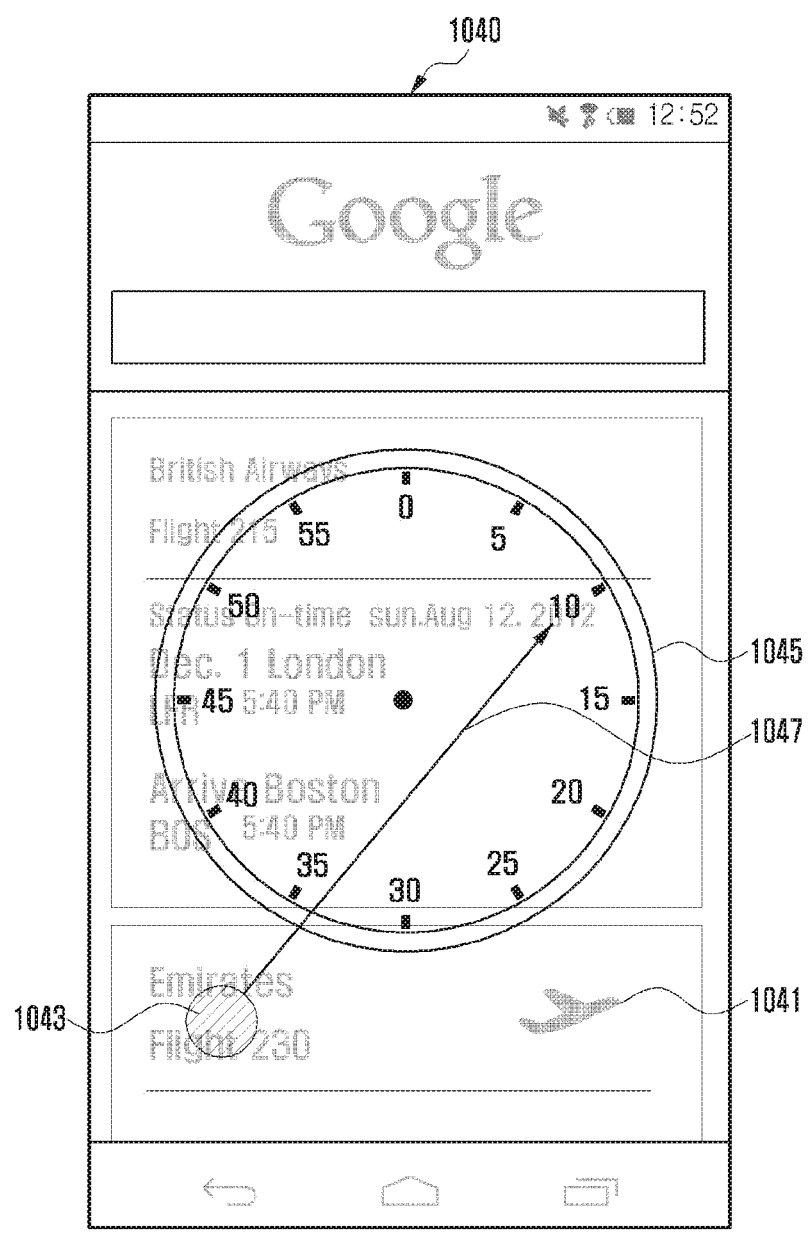
FIG. 10D is a diagram illustrating another exemplary screen display for explaining a method for setting a snooze mode for a predetermined function of an application running on an electronic device according to the second embodiment of the present invention.

FIG. 10D is a diagram illustrating another exemplary screen display for explaining a method for setting a snooze mode for a predetermined function of an application running on an electronic device.

For example, the electronic device may execute an information provision application for a function of providing information. If the user wants to see the information provided in the current main page after a predetermined time, the electronic device may configure the snooze mode for the information provision function according to the manipulation of the user.

For example, if a predetermined user input 1043 (e.g., long press input) is detected in an information menu 1041 displayed in the information provision application execution screen, the electronic device may display a clock object 1045 as an example of a snooze time setting object. If a drag input 1047 continued from the user input toward one of twelve numbers of the clock object 1045 is detected, the electronic device may set the snooze time to the time corresponding to the number on which the drag input 1047 is released. Also, if an input (not shown) for selecting a time is detected on the clock object 1045, it may be possible to set the snooze time to the time selected by the input.

If the drag input 1047 is released, the electronic device may execute the snooze mode of the information provision function. After expiry of the snooze time, the electronic device may provide the information corresponding to the information menu 1041. For example, the electronic device may display the information in the main page of the application execution screen or the notification information display region.

Figure 11:
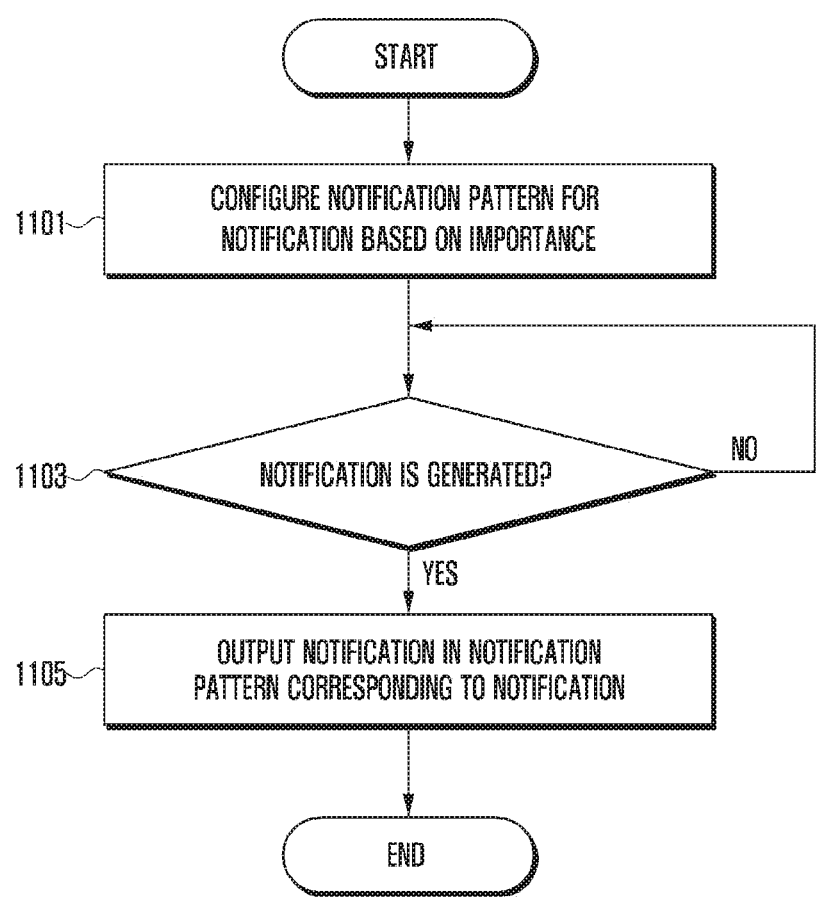
FIG. 11 is a flowchart illustrating a method for outputting a notification based on a notification pattern of an electronic device according to the third embodiment of the present invention.

FIG. 11 is a flowchart illustrating a method for outputting a notification based on a notification pattern of an electronic device (e.g., electronic device 101) according to the third embodiment of the present invention. In this embodiment, the notification pattern may mean a pattern for the electronic device to output a notification. For example, the notification pattern may include a pattern of outputting the notification through at least one output unit (e.g., display, light source unit, and audio output unit) as time passes. For example, the operation depicted in FIG. 11 may be implemented by a notification control unit (e.g., notification control unit 120) of the electronic device.

The electronic device may configure the notification pattern for the notification at step 1101. The electronic device may configure a different notification pattern depending on contact, function (e.g., residual battery notification function and network connection status notification function) or type of application. The notification pattern may be configured differently according to the importance or priority of the corresponding notification. The pattern configuration information per notification may be stored in the memory (e.g., memory 130).

The electronic device may determine at step 1103 whether a notification is generated. For example, the notification may be generated by an internal operation of the electronic device or received from outside through a network.

At step 1105, the electronic device may check for the notification pattern corresponding to the generated notification based on the stored notification pattern configuration information and output the notification in the checked notification pattern.

FIG. 12A is a diagram illustrating notification patterns set based on importance of notification.

According to an embodiment of the present invention, the electronic device (e.g., electronic device 101) may set different notification patterns for contact, function, or type of application according to an importance or priority of the corresponding notification.

For example, the importance may be categorized into one of normal notification, important notification, and urgent notification. As an example of notification output, if a notification is output in the form of a light by means of a light source unit of the electronic device, the electronic device may set different notification patterns 1201, 1203, and 1205 according to the importance.

According to various embodiments of the present invention, it may be possible to output different notification patterns based on the type of notification or the elapsed time after generation of the notification as well as the importance of the notification.

Figure 12B:
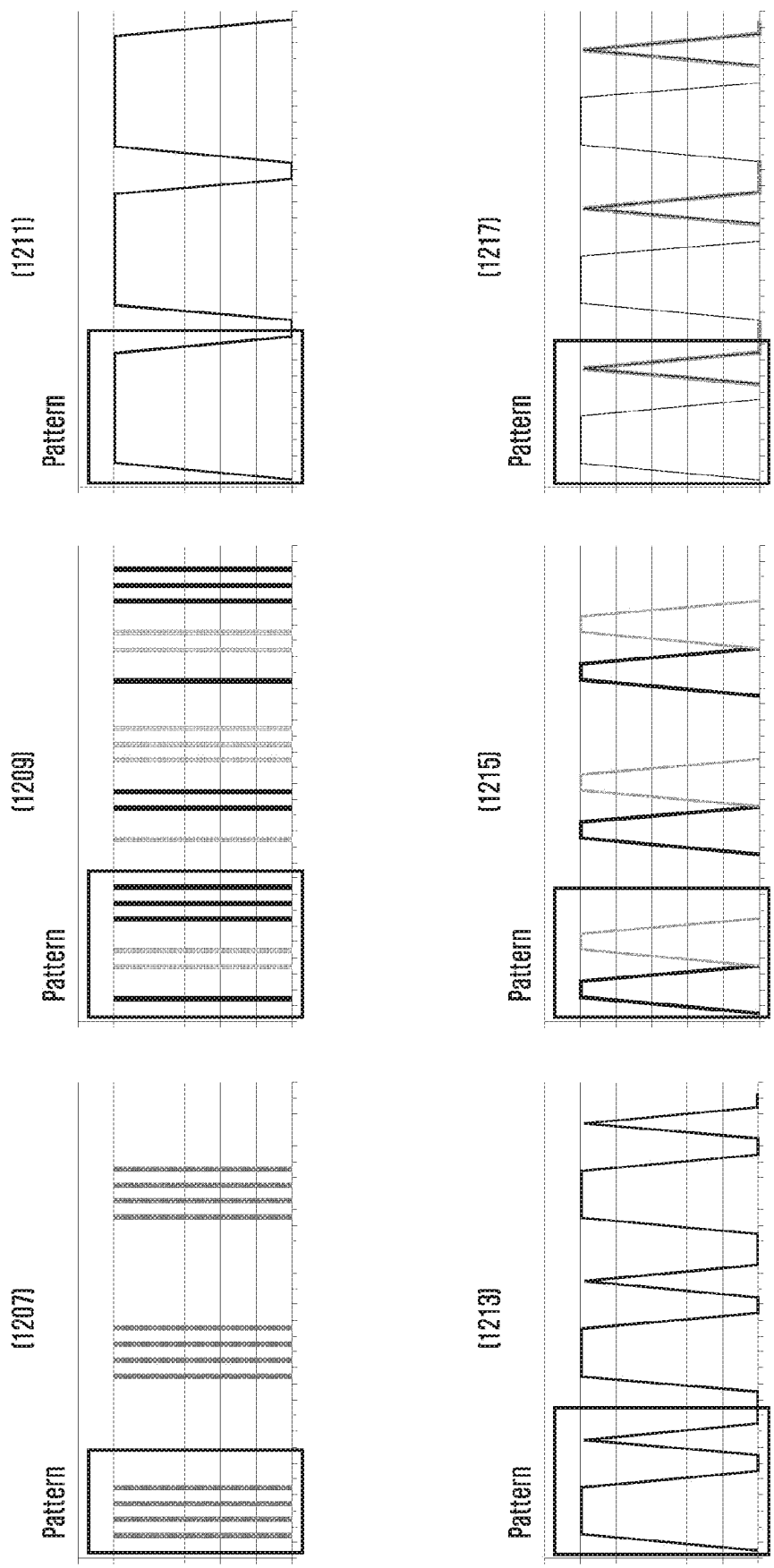
FIG. 12B is a diagram illustrating various exemplary notification patterns according to the third embodiment of the present invention.

FIG. 12B is a diagram illustrating various exemplary notification patterns.

FIG. 12B shows various exemplary notification patterns in the case where the notification is output in the form of a light by means of the light source unit of the electronic device.

For example, the notification pattern may be designed in the form of repeating the same blink pattern as denoted by reference number of 1207. When a notification is generated, the same blink pattern is output repeatedly at a time interval.

Alternatively, the notification pattern may be designed in the form of outputting blink patterns having different numbers of blinks as denoted by reference number 1209. When a notification is generated, the different blink patterns are output in a sequence repeatedly at a time interval.

Alternatively, the notification pattern may be designed in the form of a pulse having a predetermined duration as denoted by reference number 1211. If the notification is generated, the pulse pattern having the predetermined duration may be output repeatedly at a time interval.

Alternatively, the notification pattern may be designed in the form of a pulse pattern having a unique waveform that is repeating as denoted by reference number 1213. When a notification is generated, the pulse pattern having the unique waveform may be output repeatedly at a time interval.

Alternatively, the notification pattern may be designed in the form of a pattern of different color light blinks or pulse waveforms as denoted by reference number 1215. When the notification is generated, the different color light blinks or pulse waveform may be output repeatedly at a time interval.

Alternatively, the notification pattern may be designed in the form of a pulse pattern having a unique waveform with different colors as denoted by reference number 1217. When the notification is generated, the unique pulse waveform with different colors may be output repeatedly.

Figure 13:
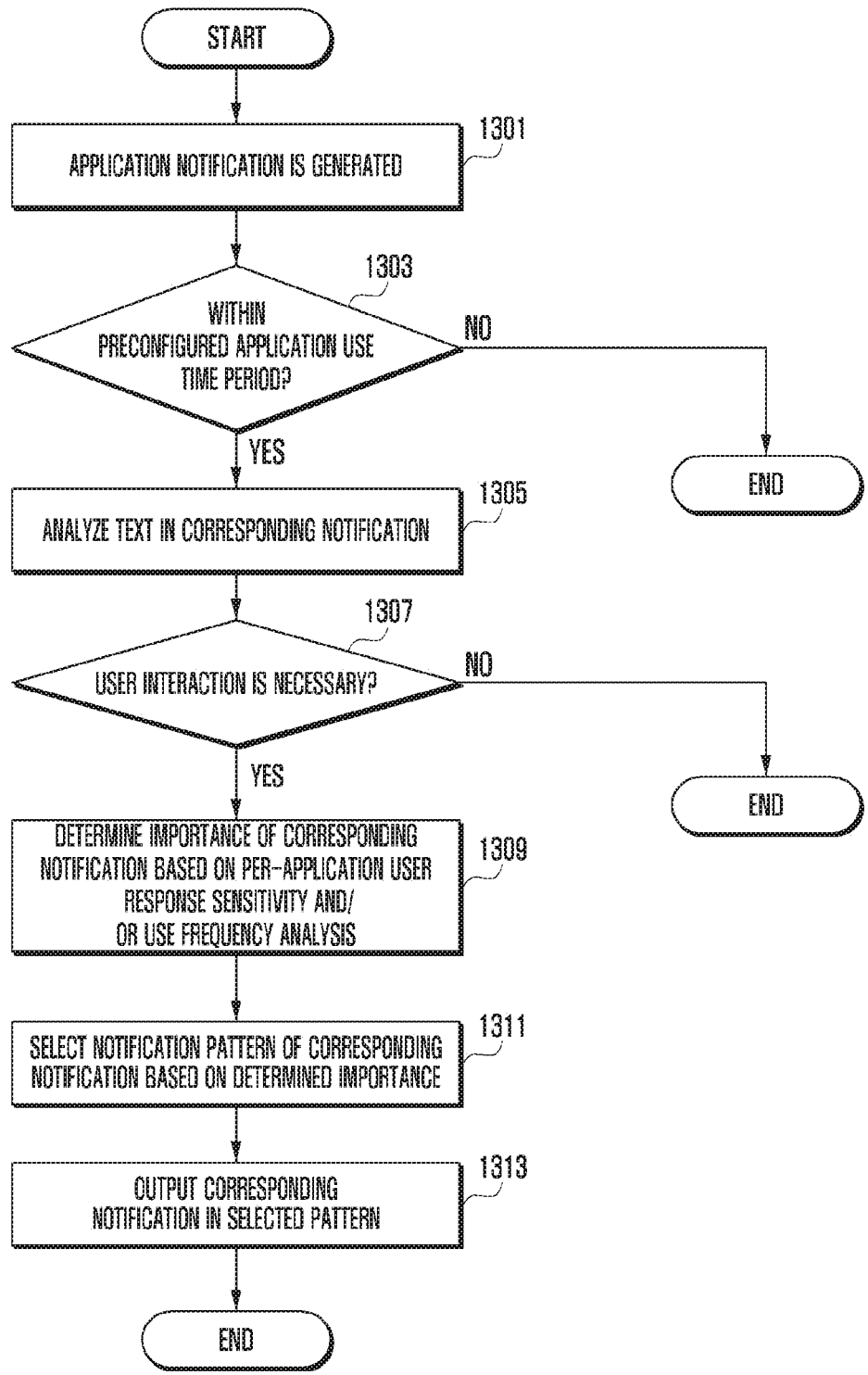
FIG. 13 is a flowchart illustrating a method for an electronic device to analyze text in notification information and provide notification in a notification pattern based on the analysis result according to the fourth embodiment of the present invention.

FIG. 13 is a flowchart illustrating a method for an electronic device (e.g., electronic device 101) to analyze text in notification information and provide notification in a notification pattern based on the analysis result according to the fourth embodiment of the present invention. This embodiment is characterized by analyzing, after notification information is generated, text in the notification information and determining the notification pattern based on the analysis result rather than preconfiguring the notification pattern for each notification information. For example, the operation depicted in FIG. 13 may be implemented by a notification control unit (e.g., notification control unit 120) of the electronic device.

At step 1301, the electronic device may detect generation of a notification related to an application. For example, the notification may be generated by an internal operation of the electronic device or received from outside through a network.

At step 1303, the electronic device may determine whether a notification generation time is within a predetermined application use time period. For example, a sleep-related application may have a use time period set to a night-time period, and a music playback application may have a use time period set to a morning period and/or an afternoon period. If the notification generation time is out of the preconfigured application use time period, the electronic device may not perform subsequent operations related to notification output.

If the notification generation time is within the configured application use time period, the electronic device may analyze the text included in the corresponding notification at step 1305. At step 1307, the electronic device may determine whether the corresponding notification requires user interaction based on the analysis result. For example, if the notification is an application update notification or advertisement notification, the electronic device may determine that there is no need of a user interaction. If it is determined that there is no need of a user interaction, the electronic device may not perform a subsequent action related to notification output.

It if it is determined that there is a need of a user interaction, the electronic device may determine at step 1309 the importance of the corresponding notification based on user response sensitivity and/or use frequency analysis per application. The user response sensitivity may mean the sensitivity of the user's subsequent action related to the notification of the corresponding application. The use frequency may mean the corresponding application use frequency of the user. The electronic device may determine that the importance of the corresponding notification increases as the user response sensitivity and the user frequency increases.

At step 1311, the electronic device may select a notification pattern for the corresponding notification based on the determined importance. For example, a notification pattern corresponding to the importance may be stored in advance. At step 1313, the electronic device may output the corresponding notification in the selected notification pattern. Accordingly, the user may check for the importance of the corresponding notification based on the output pattern of the notification.

Figure 14:
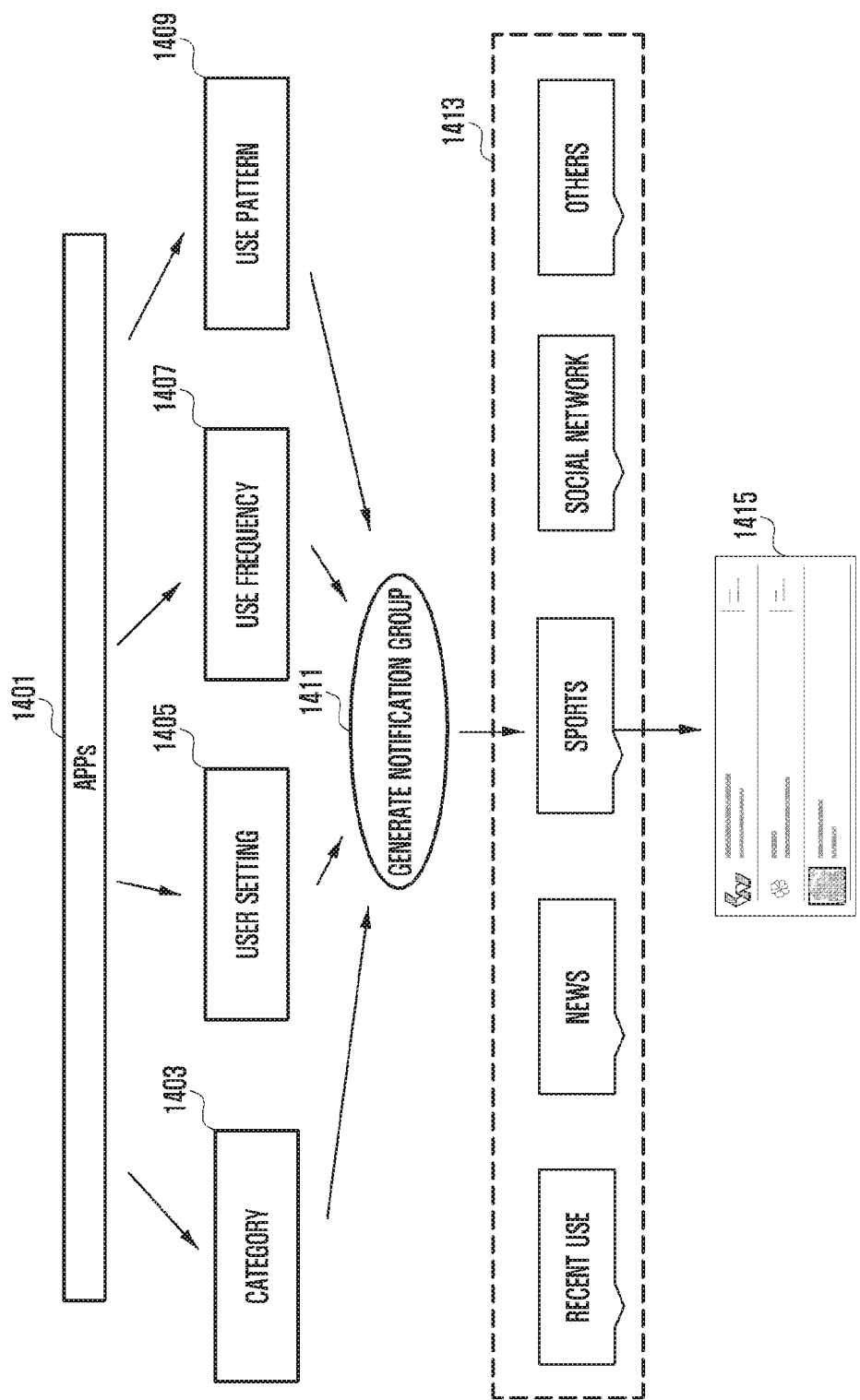
FIG. 14 is a diagram illustrating a method for providing per-group notification of an electronic device according to the fifth embodiment of the present invention.

FIG. 14 is a diagram illustrating a method for providing per-group notification of an electronic device 101 according to the fifth embodiment of the present invention. This embodiment is characterized in that related applications are grouped to display a notification per group, instead of displaying application-specific notifications individually, in the notification information display region. For example, the operation depicted in FIG. 14 may be implemented by a notification control unit (e.g., notification control unit 120) of the electronic device.

The electronic device may include a plurality of applications 1401. The electronic device may group the applications 1401 according to a predetermined rule. For example, the electronic device may group the applications 1401 into notification groups, as denoted by reference number 1411, according to at least one of category 1403 of application, user setting 1405, application use frequency 1407, and application use pattern 1409. The generated notification groups 1413 may include a recently used application group, a news group, a sports group, a social network group, and others. If one of the notification groups 1413 is selected, the electronic device may provide detailed information 1415 of the respective applications included in the corresponding notification group.

Figure 15:
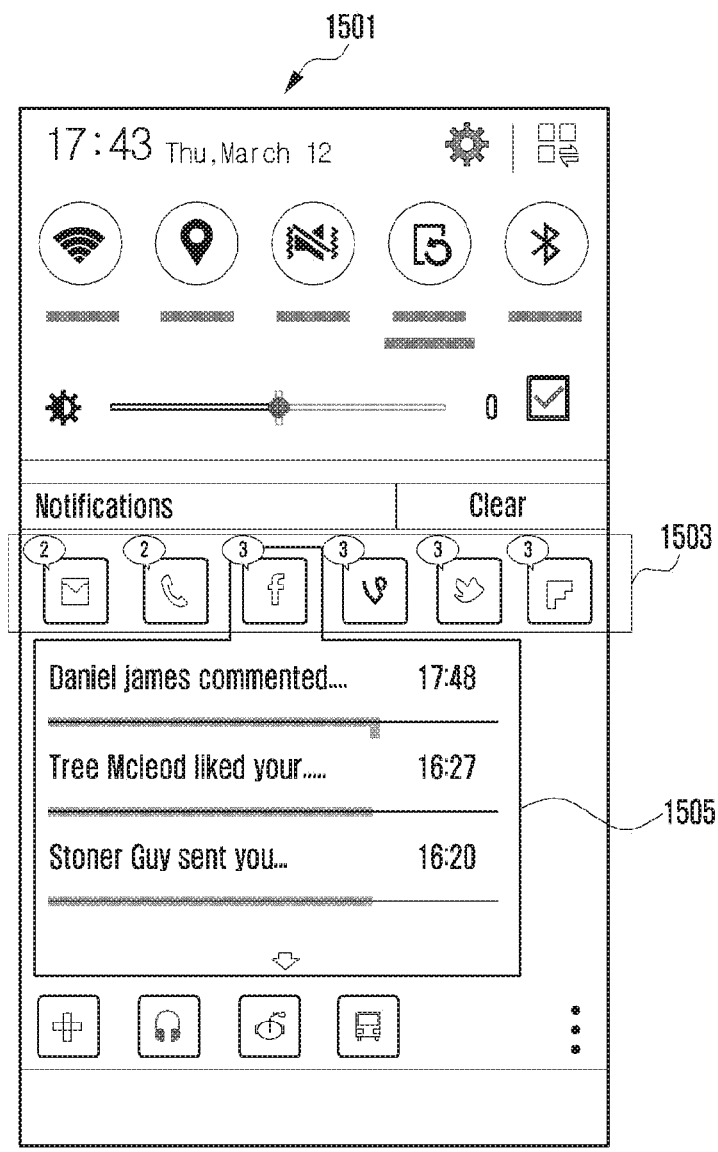
FIG. 15 is a diagram illustrating an exemplary screen display for explaining a per-group notification provision method according to the fifth embodiment of the present invention.

FIG. 15 is a diagram illustrating an exemplary screen display for explaining a per-group notification provision method.

The electronic device (e.g., electronic device 101) may output a notification tray 1501 including a notification information display region. The notification information display region may display at least one notification group 1503. For example, each of the applications belonging to the notification group 1503 may be displayed along with a number of notifications. If an input for selecting one of the applications belonging to the notification group is detected, the electronic device may provide the detailed information 1505 of the selected application in the notification information display region.

Figure 16:
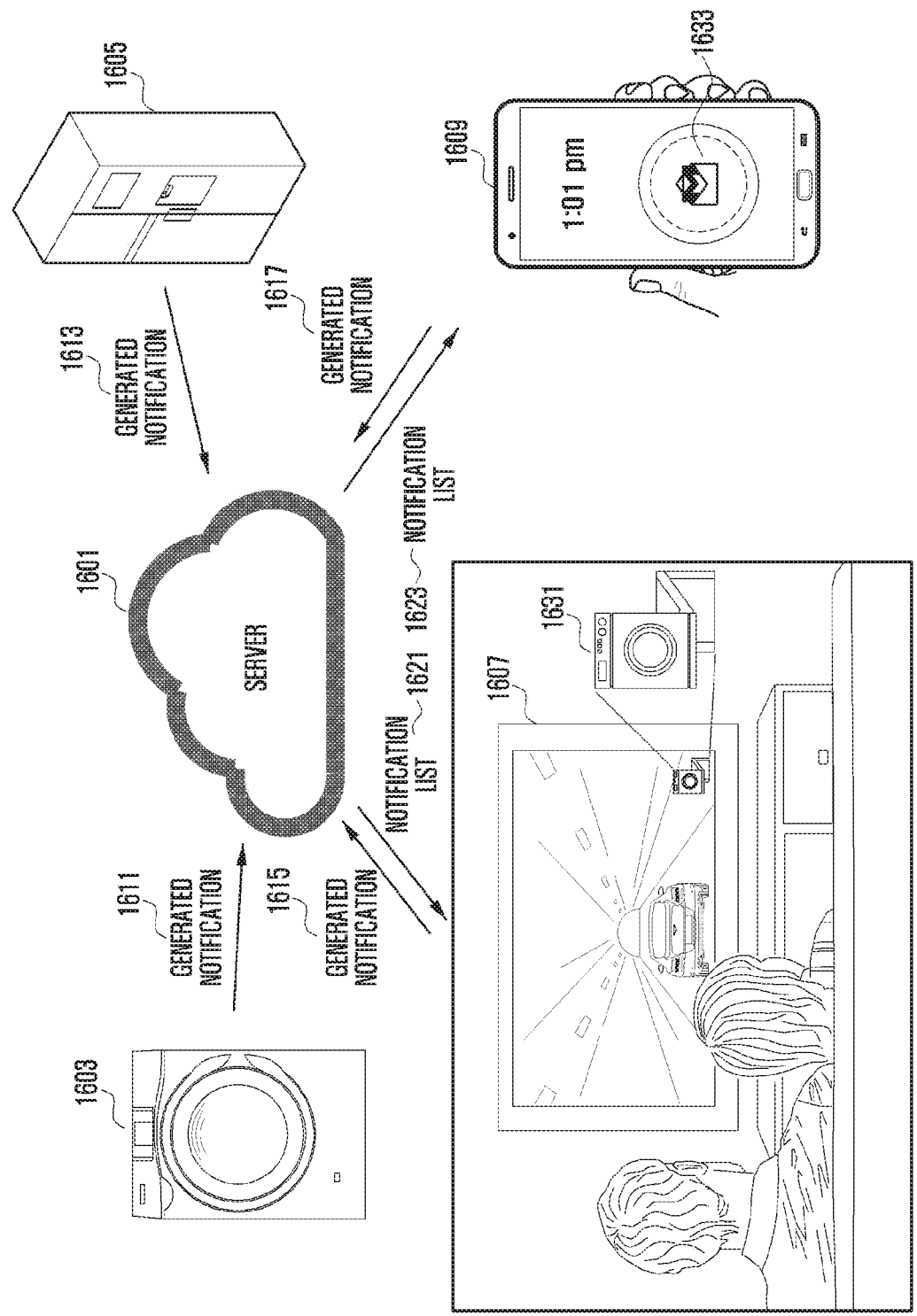
FIG. 16 is a diagram illustrating a method for managing notification information of multiple electronic devices through a server according to the sixth embodiment of the present invention.

FIG. 16 is a diagram illustrating a method for managing notification information of multiple electronic devices through a server according to the sixth embodiment of the present invention.

For example, in the case where a plurality of electronic devices is connected into a network system (e.g., smart home system), it is important to manage the notifications related to the electronic devices of the corresponding system collectively. This embodiment is characterized in that a server (e.g., cloud server) manages the notifications of the electronic devices composing the system.

In this embodiment, the network system may include a server 1601 and a plurality of electronic devices 1603 to 1609 that are registered with the server 1601. If the network system is a smart home system, the electronic devices 1603 to 1609 may include various electric appliances (e.g., washing machine 1603, refrigerator 1603, and a TV 1607) and user's portable electronic devices (e.g., smartphone 1609 and smart watch (not shown)).

If notifications are generated, the electronic devices 1603 to 1609 may transmit the generated notifications to the server 1601 as denoted by reference numbers 1611 to 1617. The generated notifications may have various properties by which the notifications are sorted into, for example, user action-requiring notification (e.g., notification of completion of washing operation of the washing machine), alert notification (e.g., low battery alert), information and/or advertisement notification.

The server 1601 may manage the received notifications to provide the user with the notification efficiently.

The server 1601 may provide a predetermined electronic device with a list of notifications that are not checked by the user (hereinafter, referred to as unchecked notifications) among the received notifications as denoted by reference numbers 1631 and 1633.

For example, the server 1601 may determine an electronic device for use in providing the user with the list of uncheck notifications based on the activated/deactivated status and assigned priority of the registered electronic devices. If an electronic device is in the activated state, this means that a user interaction is detected in association with the electronic device at the corresponding time point and the electronic device is in use. The importance of the electronic device may be categorized into main device (e.g., smartphone and smart watch) and secondary device (e.g., washing machine and refrigerator) according to whether the electronic device is multi-functional. The server 1601 may send the unchecked notification list to the electronic device 1607 in the activated state and/or to the main device 1609. For example, the TV 1607 in the activated state may provide the user with the unchecked notification-related information 1631 on its screen, and the smartphone 1609 may provide the user with the unchecked notification-related information on a lock screen even in the locked state. Alternatively, the server 1601 may preferentially send the unchecked notification list to the electronic device 1607 in the activated state; but, if there is no electronic device in the activated device, it may send the unchecked information list to the main device 1609.

According to various embodiments of the present invention, the server 1601 may assign a priority by property of the received notification. The server 1601 may select the electronic device for use in providing the user with the notification list transfer order and/or notification list based on the priority. For example, a notification requiring a user's action may have the highest priority, an alert notification may have the next highest priority, and information and/or an advertisement notification may have the lowest priority.

The server 1601 may select the electronic device for use in providing the notification list according to the property of the received notification. For example, it may be possible to send a notification requiring a user's action to the activated device or the main device, an alert notification to at least one of the activated and main devices, and information and/or an advertisement notification to the main device or an electronic device related to the corresponding information or advertisement. If the notification is associated with an electronic device, the server 1601 may send the notification to the corresponding electronic device.

Figure 17:
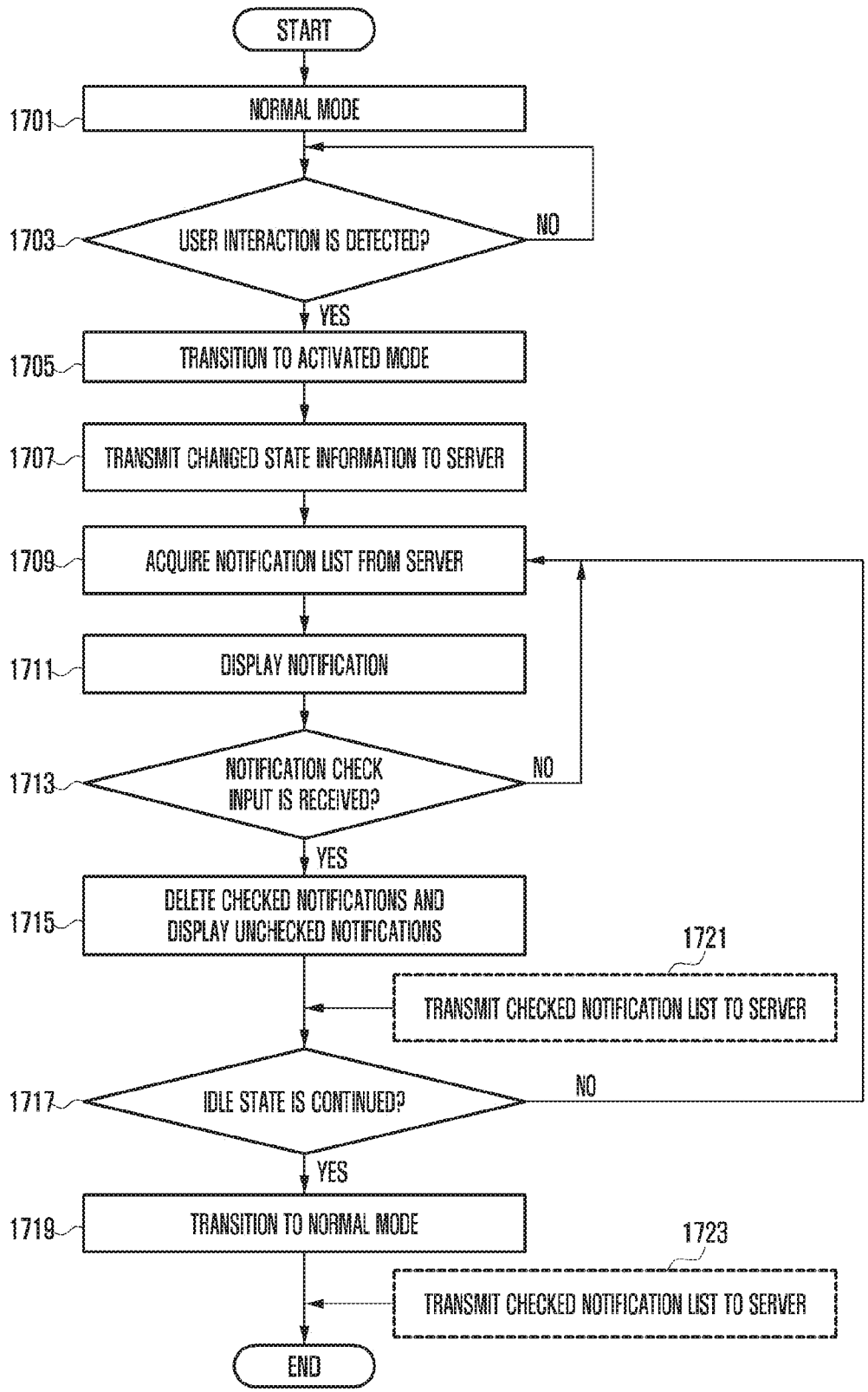
FIG. 17 is a flowchart illustrating a method for providing a user with notification information from a server by means of an electronic device in a network according to the sixth embodiment of the present invention.

FIG. 17 is a flowchart illustrating a method for providing a user with notification information from a server by means of an electronic device in a network.

At step 1701, the electronic device (e.g., electronic device 101) as one of a plurality of electronic devices (registered with the server) composing a system may be operating in a normal mode or a deactivated mode.

At step 1703, the electronic device may detect a user interaction. If a user interaction is detected, the electronic device may enter the activated mode at step 1705. At step 1707, the electronic device may transmit to the server (e.g., server 106) a changed state information indicating that the operation state has been transitioned to the activated state.

At step 1709, the electronic device in the activated state may acquire a notification list from the server. The notification list may contain notifications related to a plurality of electronic devices in the system. The notification list may contain the unchecked notifications that have been generated previously but not checked or newly generated notifications.

At step 1711, the electronic device may display the unchecked notifications based on the acquired notification list. At step 1713, the electronic device may receive a notification check input made by the user.

At step 1715, the electronic device may delete the checked notification and continue displaying only the unchecked notification in response to the notification check input. At step 1717, the electronic device may determine whether it has been in an idle state over a predetermined time period. If the electronic device has not been in the idle state over the predetermined time period, it may acquire the notification list continuously from the server. If the electronic device has been in the idle state over the predetermined period, it may perform a state change to the normal mode at step 1719.

The electronic device may transmit to the server the notification list checked in response to the notification check input. For example, the electronic device may transmit to the server the checked notification list at step 1721 after the receipt of the notification check input (before or after step 1715) and after transitioning from the idle state to the normal mode. Although not shown in the drawing, if the electronic device in the activated state receives a notification notifying that a new electronic device has entered the activated mode from the server, it may transmit the checked notification list to the server in response to the notification.

According to various embodiments of the present invention, at least part of the devices (e.g. modules or their functions) or methods (e.g., operations) may be implemented by computer program instructions stored in a computer-readable storage medium. In the case that the instructions are executed by at least one processor (e.g. processor 120), the at least one processor may execute the functions corresponding to the instructions. The computer-readable storage medium may be the memory 130. At least a part of the programming module may be implemented (e.g. executed) by the processor 120. At least a part of the programming module may include modules, programs, routines, sets of instructions, and processes for executing the at least one function.

The computer-readable storage medium includes magnetic media such as a hard disk, a floppy disk, and a magnetic tape, optical media including a compact disc read only memory (CD ROM) and a digital versatile disc (DVD) ROM, a magneto-optical media such as a floptical disk, and the hardware device designed for storing and executing program commands (e.g., programming modules) such as ROM, random access memory (RAM), and flash memory. The program commands include the language code executable by computers using the interpreter as well as the machine language codes created by a compiler. The aforementioned hardware device can be implemented with one or more software modules for executing the operations of the various exemplary embodiments of the present invention.

The module or programming module of the present invention may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A notification output control method of an electronic device, the method comprising:
   outputting notification information with a notification pattern;
   in response to detecting a first drag input on the notification information in a first direction, setting the snooze time based on a predetermined snooze time;
   in response to detecting a second drag input on the notification information in a second direction, opposite to the first direction, deleting the notification information;
   in response to detecting a third input on the notification information fora predetermined time,
   displaying an analog clock with a plurality of snooze time setting objects;
   detecting a drag gesture continued from the third input toward one of the plurality of snooze time setting objects on the analog clock;
   setting the snooze time based on a snooze time setting object of the plurality of snooze time setting objects on which the drag gesture is released;
   executing a snooze mode of the notification information according to the snooze time;
   displaying a list including at least one notification information being managed in the snooze mode while executing the snooze mode of the notification information, the list including information on remaining times for re-outputting the notification information in the snooze mode; and
   re-outputting the notification information in response to expiry of the snooze time,
   wherein the notification pattern is determined based on an importance of the notification information, and
   wherein the importance of the notification information is determined based on a user response sensitivity, use frequency and an analysis of a text in the notification system.

2. The method of claim 1, further comprising
   deleting the notification information corresponding to the third input among the at least one notification information in the list.

3. The method of claim 1,
   wherein outputting the notification information after the expiry of the snooze time comprises displaying the re-output notification information along with at least one other notification information, and
   wherein displaying the re-output notification information along with the at least one other notification information comprises assigning to the re-output notification information a priority higher than the priority of the at least one other notification information and arranging the notification information.

4. The method of claim 1, wherein re-outputting the notification information after the expiry of the snooze time comprises displaying the notification information output in response to a notification information display request after the expiry of the selected snooze time.

5. The method of claim 1,
   wherein the notification pattern is identified based on a type of the notification information and an elapsed time after outputting the notification information.

6. An electronic device, comprising:
   a touchscreen configured to display notification information and receive a touch input; and
   a processor configured to control to:
   output notification information with a notification pattern,
   in response to detecting a first drag input on the notification information in a first direction, set the snooze time based on a predetermined snooze time;
   in response to detecting a second drag input on the notification information in a second direction, opposite to the first direction, delete the notification information;

in response to detecting a third input on the notification information for a predetermined time, display an analog clock with a plurality of snooze time setting objects, detect a drag gesture continued from the third input toward one of the plurality of snooze time setting objects on the analog clock, set the snooze time based on a snooze time setting object of the plurality of snooze time setting objects on which the drag gesture is released, execute a snooze mode of the notification information according to the snooze time, display a list including at least one notification information being managed in the snooze mode while executing the snooze mode of the notification information, wherein the list includes information on remaining times for re-outputting the notification information in the snooze mode, and re-output the notification information in response to expiry of the snooze time, wherein the notification pattern is determined based on an importance of the notification information, and wherein the importance of the notification information is determined based on a user response sensitivity, use frequency and an analysis of a text in the notification information.

7. The electronic device of claim 6, wherein the processor is further configured to delete the notification information corresponding to the third input among the at least one notification information in the list.

8. The electronic device of claim 6, wherein the processor is further configured to display the re-output notification information along with at least one other notification information, assign to the re-output notification information a priority higher than the priority of the at least one other notification information, and arrange the notification information.

9. The electronic device of claim 6, wherein the processor is further configured to display the notification information output in response to a notification information display request after the expiry of the selected snooze time.

10. The electronic device of claim 6, wherein the notification pattern is identified based on a type of the notification information and an elapsed time after outputting the notification information.

\* \* \* \* \*